(12) United States Patent
Cho et al.

(10) Patent No.: US 9,886,454 B2
(45) Date of Patent: Feb. 6, 2018

(54) IMAGE PROCESSING, METHOD AND ELECTRONIC DEVICE FOR GENERATING A HIGHLIGHT CONTENT

(71) Applicant: Samsung Electronics Co., Ltd., Suwon-si (KR)

(72) Inventors: Ik Hwan Cho, Suwon-si (KR); Seung Wok Han, Seoul (KR); Heum Mo Gu, Anyang-si (KR); Kyung Sub Min, Seongnam-si (KR); Geun Woo Kim, Gwangju (KR); Sang Mi Kim, Suwon-si (KR); Tae Kyung Kim, Seoul (KR); Jung Ki Min, Suwon-si (KR); Seong Ook Jeong, Suwon-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 15/008,009

(22) Filed: Jan. 27, 2016

(65) Prior Publication Data
US 2016/0217348 A1 Jul. 28, 2016

(30) Foreign Application Priority Data
Jan. 27, 2015 (KR) .......................... 10-2015-0012655

(51) Int. Cl.
*G06K 9/62* (2006.01)
*G06F 17/30* (2006.01)
(Continued)

(52) U.S. Cl.
CPC .......... *G06F 17/3028* (2013.01); *G06F 17/30* (2013.01); *G06K 9/00335* (2013.01);
(Continued)

(58) Field of Classification Search
CPC . G06F 17/30; G06F 17/3028; G06K 9/00751; G06K 9/6215; G06K 9/6284; G06K 2209/27; G06T 1/0007
(Continued)

(56) References Cited

U.S. PATENT DOCUMENTS 8,184,947 B2  5/2012  Murabayashi et al.
8,311,277 B2 *  11/2012  Peleg .................. G06F 17/3079
                                                                    382/103
(Continued)

FOREIGN PATENT DOCUMENTS

KR      20140060760 A    5/2014
WO      2008/093321 A1   8/2008

OTHER PUBLICATIONS

Int'l Search Report and Written Opinion for PCT/KR2016/000620 dated May 24, 2016.
European Search Report for EP 16152409.5 dated Jun. 15, 2016.

*Primary Examiner* — Amara Abdi
(74) *Attorney, Agent, or Firm* — McAndrews, Held & Malloy, Ltd.

(57) ABSTRACT

An image processing method and an electronic device supporting the same are disclosed. An electronic device is provided to collect a plurality of images. The electronic device may collect the images by taking pictures/videos with a camera or by receiving the images from an external device. The electronic device also includes a processor able to determine an activity type during at least a portion of time when the images were taken by the camera or an activity type of the device that originally generated the images received from the external device. The processor may be able to select at least some of the collected images based on the activity type to generate a highlight content.

20 Claims, 14 Drawing Sheets

(51) Int. Cl.
  *G06T 1/00* (2006.01)
  *G06K 9/00* (2006.01)
(52) U.S. Cl.
  CPC ........ *G06K 9/00751* (2013.01); *G06T 1/0007* (2013.01); *G06K 2209/27* (2013.01)
(58) Field of Classification Search
  USPC ................................. 382/260, 170, 103, 224
  See application file for complete search history.

(56) References Cited

U.S. PATENT DOCUMENTS

| | | | |
|---|---|---|---|
| 8,457,402 B2 | 6/2013 | Miller et al. | |
| 8,737,803 B2 | 5/2014 | Pereira | |
| 2009/0103888 A1* | 4/2009 | Murabayashi | G06F 17/30811 386/248 |
| 2010/0014840 A1* | 1/2010 | Nagai | H04H 60/33 386/224 |
| 2010/0045596 A1 | 2/2010 | De Leon | |
| 2010/0092037 A1* | 4/2010 | Peleg | G06F 17/3079 382/103 |
| 2010/0202657 A1* | 8/2010 | Salgian | G06K 9/00805 382/103 |
| 2011/0066383 A1 | 3/2011 | Jeetendra et al. | |
| 2012/0017238 A1 | 1/2012 | Miller et al. | |
| 2012/0301100 A1 | 11/2012 | Pereira | |
| 2013/0027551 A1 | 1/2013 | Peleg et al. | |
| 2013/0346014 A1 | 12/2013 | Nadkarni et al. | |
| 2014/0236958 A1* | 8/2014 | Vaughn | G06F 17/30 707/741 |
| 2014/0328570 A1* | 11/2014 | Cheng | G11B 27/10 386/241 |
| 2015/0112899 A1* | 4/2015 | Dagum | A61B 5/6898 706/12 |
| 2015/0304557 A1 | 10/2015 | Choi | |
| 2016/0004911 A1 | 1/2016 | Chang et al. | |

* cited by examiner

IMAGE PROCESSING, METHOD AND ELECTRONIC DEVICE FOR GENERATING A HIGHLIGHT CONTENT

PRIORITY

This application claims priority to Korean Patent Application No. 10-2015-0012655, filed on Jan. 27, 2015, the content of which is incorporated herein by reference.

BACKGROUND OF THE INVENTION

1. Field of the Invention

The present disclosure relates to electronic devices, and more particularly to electronic devices that classify images into groups.

2. Background of the Invention

Various electronic devices such as conventional smartphones provide image collection function for pictures or videos taken on the electronic devices, and/or for downloaded pictures or videos. However, the image collection function provided by conventional electronic devices is focused on simply collecting images. But, especially in light of the large amounts of memory typically supported by conventional electronic devices, users can collect a large number of photos and videos. Accordingly, users can expend a great deal of time and effort in searching through the collected photos and videos to select those they may want to keep or share with others.

SUMMARY OF THE INVENTION

Aspects of the present disclosure are to address at least the above-mentioned problems and/or disadvantages and to provide at least the advantages described below.

In accordance with an aspect of the present disclosure, an electronic device is provided. The electronic device may include memory configured to store a plurality of images and a processor configured to be functionally connected with the memory. The processor may be able to determine an activity type associated with a source of the plurality of images during at least a portion of the time when the plurality of images were collected by the source. The source of the plurality of images may be the electronic device or an external electronic device. The processor may be configured to use an image processing scheme that corresponds to the activity type to determine as highlight images one or more of the plurality of images. The processor may also be configured to generate a highlight content from the highlight images.

In accordance with another aspect of the present disclosure, an image processing method is provided. The image processing method may include storing a plurality of images in memory of the electronic device. The method may comprise determining an activity type associated with a source of the plurality of images during at least a portion of the time when the plurality of images were collected by the source. The source of the plurality of images may be the electronic device or an external electronic device. An image processing scheme with a certain filtering condition may be determined based on the activity type. The image processing scheme may be applied to the plurality of images to select at least one of the plurality of images as highlight images, and highlight content may be generated from the highlight images.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION OF EMBODIMENTS OF THE PRESENT INVENTION

Figure 1:
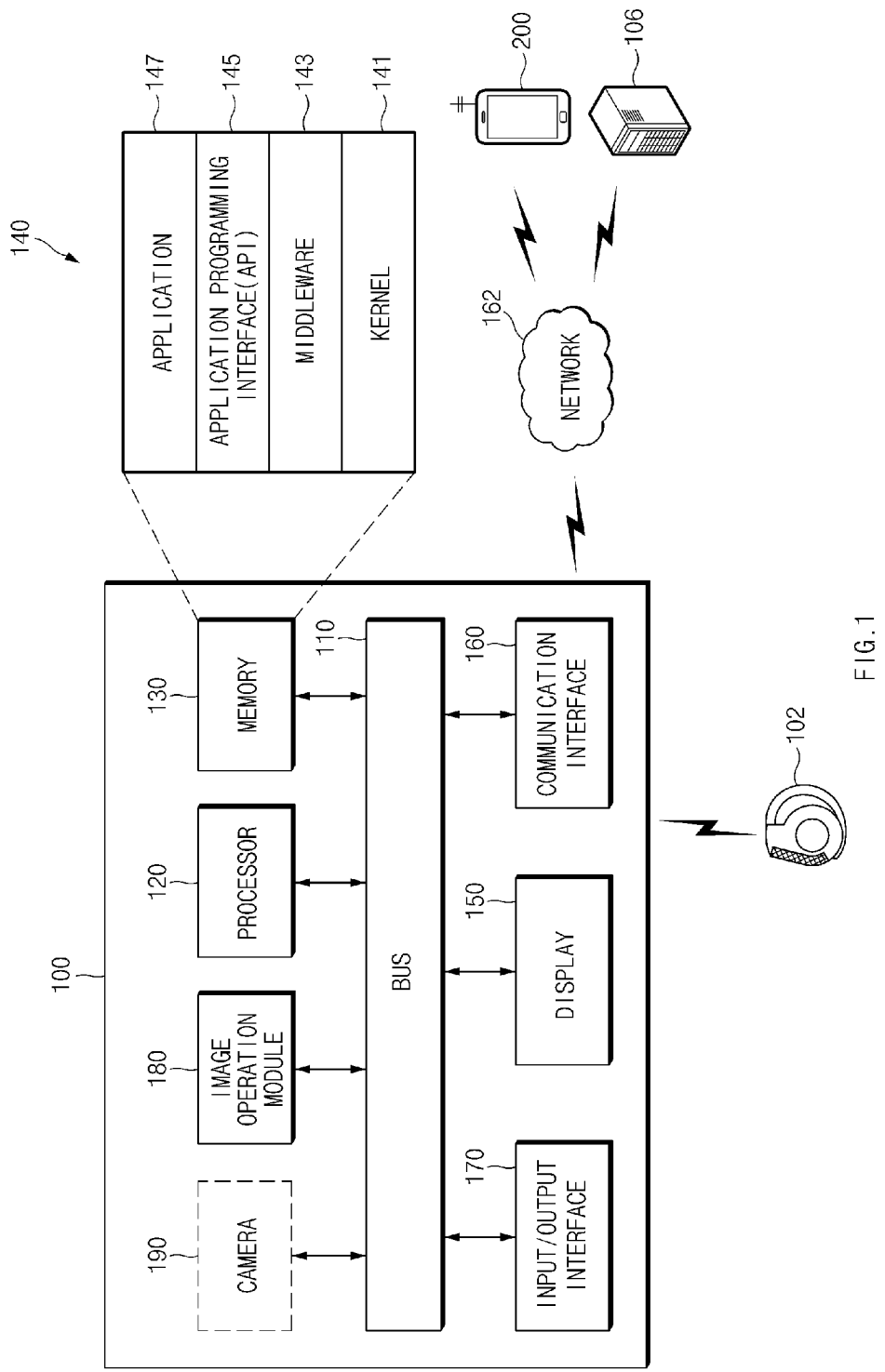
FIG. 1 is a block diagram illustrating a configuration of an electronic device in a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary.

Accordingly, those of ordinary skill in the art will recognize that various changes and modifications of the various embodiments described herein can be made without departing from the scope of the present disclosure. In addition, descriptions of well-known functions and constructions may be omitted for clarity and conciseness.

In the disclosure disclosed herein, the expressions "have," "may have," "include" and "comprise," or "may include" and "may comprise" used herein indicate existence of corresponding features (e.g., elements such as numeric values, functions, operations, or components) but do not exclude presence of additional features.

In the disclosure disclosed herein, the expressions "A or B," "at least one of A and/or B," or "one or more of A and/or B," and the like used herein may include any and all combinations of one or more of the associated listed items. For example, the term "A and/or B," "at least one of A and B," or "at least one of A or B" may refer to all of the case (1) where at least one A is included, the case (2) where at least one B is included, or the case (3) where both of at least one A and at least one B are included.

The expressions such as "1st," "2nd," "first," or "second," and the like used in various embodiments of the present disclosure may refer to various elements irrespective of the order and/or priority of the corresponding elements, but do not limit the corresponding elements. The expressions may be used to distinguish one element from another element. For instance, both "a first user device" and "a second user device" indicate different user devices from each other irrespective of the order and/or priority of the corresponding elements. For example, a first component may be referred to as a second component and vice versa without departing from the scope of the present disclosure.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there is no intervening element (e.g., a third element).

Depending on the situation, the expression "configured to" used herein may be used as, for example, the expression "suitable for," "having the capacity to," "designed to," "adapted to," "made to," or "capable of." The term "configured to" must not mean only "specifically designed to" by using hardware. Instead, the expression "a device configured to" may mean that the device is "capable of" operating together with another device or other components. For example, a "processor configured to perform A, B, and C" may mean a generic-purpose processor (e.g., a central processing unit (CPU) or an application processor) that may perform corresponding operations by executing one or more software programs, or a dedicated processor (e.g., an embedded processor) for performing corresponding operations by executing machine readable code.

Terms used in this specification are used to describe various embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal way unless expressly defined so in the present disclosure. Terms defined in the specification may not be interpreted to exclude embodiments of the present disclosure unless explicitly stated so.

Electronic devices according to various embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices (e.g., smart glasses, head-mounted-devices (HMDs), an electronic apparel, electronic bracelets, electronic necklaces, electronic appcessories, electronic tattoos, smart mirrors, or smart watches).

According to various embodiments of the present disclosure, the electronic devices may be smart home appliances. The smart home appliances may include at least one of, for example, televisions (TVs), digital versatile disk (DVD) players, blue-ray disc (BRD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

According to various embodiments of the present disclosure, the electronic devices may include at least one of various medical devices such as various portable medical measurement devices (e.g., blood glucose meters, heart rate meters, blood pressure meters, or thermometers), a magnetic resonance angiography (MRA) device, a magnetic resonance imaging (MRI) device, a computed tomography (CT) device, scanners, or ultrasonic devices, and the like, navigation devices, global positioning system (GPS) receivers and/or other global navigation satellite system (GNSS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to various embodiments of the present disclosure, the electronic devices may include at least one of parts of furniture or buildings/structures, electronic boards, electronic signature receiving devices, projectors, or various measuring instruments (e.g., water meters, electricity meters, gas meters, or wave meters, and the like). The electronic devices according to various embodiments of the present disclosure may be one or more combinations of the above-mentioned devices. The electronic devices according to various embodiments of the present disclosure may be flexible electronic devices. Also, electronic devices according to various embodiments of the present disclosure are not limited to the above-mentioned devices, and may include new electronic devices introduced as technology progresses.

Hereinafter, electronic devices according to various embodiments of the present disclosure will be described with reference to the accompanying drawings. The term "user" used herein may refer to a person who uses an electronic device or may refer to a device (e.g., an artificial electronic device) that uses an electronic device.

FIG. 1 is a block diagram illustrating a configuration of an electronic device in a network environment according to various embodiments of the present disclosure.

Referring to FIG. 1, an electronic device 100 in a network system environment may include a bus 110, a processor 120, a memory 130, the input and output interface 170, a display 150, an image operation module 180, a camera 190, and a communication interface 160. In various embodiments of the present disclosure, at least one of the components may be omitted from the electronic device 100 and/or other components may be additionally included in the electronic device 100.

The bus 110 may be, for example, a circuit that may connect the processor 120, the memory 130, the input and output interface 170, the display 150, the image operation module 180, the camera 190, and the communication interface 160 with each other and may transmit communication (e.g., a control message and/or data) between the components. According to an embodiment of the present disclosure, the bus 110 may transmit an image (e.g., a moving image or a still image) collected by the camera 190 to at least one of the image operation module 180 or the processor 120. A moving image may be, for example, a TV program image, a Video On Demand (VOD), a user-created content (UCC), a music video, or a YouTube image, and may generally be referred to as a video. A video may also be taken by the user on the electronic device. According to various embodiments of the present disclosure, the bus 110 may transmit a grouped image (or a meeting image, a crowd image, a clustering image, and the like) processed in the image operation module 180 or the processor 120 to at least one of the memory 130, the display 150, or the communication interface 160.

The processor 120 may include one or more of a central processing unit (CPU), an application processor (AP), and a communication processor (CP). The processor 120 may execute, for example, calculations or data processing for control and/or communication of at least another component of the electronic device 100. According to an embodiment of the present disclosure, the processor 120 may control the camera 190 in response to an input event. The processor 120 may support calculations necessary for processing images collected by the camera 190. According to various embodiments of the present disclosure, the image operation module 180 may include at least one processor. Alternatively, the image operation module 180 may be configured with at least one software module or at least one hardware module associated with the processor 120.

The memory 130 may include volatile memory and/or non-volatile memory. The memory 130 may store instructions and/or data associated with at least another component of the electronic device 100. For example, the memory 130 may store images collected by the camera 190. Also, the memory 130 may store grouped images generated from the collected images. The grouped images may include a plurality of still images and/or a plurality of images from a video at constant time intervals. An image from a video may also be referred to as a video frame.

According to an embodiment of the present disclosure, the memory 130 may store at least one program 140. The program 140 may include a kernel 141, a middleware 143, an application programming interface (API) 145, and/or an application program 147 (or "an application"). At least part of the kernel 141, the middleware 143, and/or the API 145 may be referred to as an operating system (OS).

The kernel 141 may control or manage, for example, system resources (e.g., the bus 110, the processor 120, or the memory 130, and the like) used to execute an operation or function implemented in the other programs (e.g., the middleware 143, the API 145, or the application program 147). Also, as the middleware 143, the API 145, or the application program 147 accesses a separate component of the electronic device 100, the kernel 141 may provide an interface which may control or manage system resources. According to various embodiments of the present disclosure, the kernel 141 may provide an interface associated with controlling the camera 190, an interface that may control or manage system resources associated with image processing, and the like.

The middleware 143 may play a role as, for example, a go-between such that the API 145 or the application program 147 can communicate commands and/or data with the kernel 141. Also, the middleware 143 may process one or more work requests received from the application program 147 according to priority. For example, the middleware 143 may provide priority for use of system resources (the bus 110, the processor 120, or the memory 130, and the like) of the electronic device 100 to at least one of the application program 147. For example, the middleware 143 may schedule or load balance work requests according to priority associated with the work requests. According to an embodiment of the present disclosure, the middleware 143 may support scheduling of analyzing activity corresponding to at least one of operation situation, operation environment, information storing state, or exercise state of the electronic device 100. Accordingly, the middleware 143 may select an image processing scheme in response to an activity type, and proceed to generate highlight content from images selected by using the image processing scheme.

The API 145 may be, for example, an interface in which the application program 147 controls a function provided from the kernel 141 or the middleware 143. For example, the API 145 may include at least one interface or function (e.g., instruction) for file control, window control, image processing, text control, and the like. According to various embodiments of the present disclosure, the API 145 may include an API associated with operating the camera 190, an API associated with analyzing an activity for collected images, and an API that defines an image processing scheme for at least one activity. Also, the API 145 may include at least one API corresponding to at least one processing module included in image processing scheme. The API 145 may include an API for generating highlight content according to grouped images generated by applying a specific image processing scheme to collected images, an API associated with outputting and storing or transmitting generated highlight content, and the like.

The input and output interface 170 may play a role, for example, as an interface that may transmit instructions or data input from a user or another external device to another component (or other components) of the electronic device 100. Also, input and output interface 170 may output instructions or data received from another component (or other components) of the electronic device 100 to the user or the other external device. According to an embodiment of the present disclosure, the input and output interface 170 may generate an input signal associated with activating the camera 190, an input signal associated with controlling image collection using the activated camera 190, and the like. The input and output interface 170 may generate an input signal associated with outputting and storing or transmitting generated highlight content. Additionally or alternatively, the input and output interface 170 may generate an input signal, for selecting at least one image processing scheme of generating a grouped image of a specific form, in response to a user input.

According to various embodiments of the present disclosure, the input and output interface 170 may include an audio module. For example, if a moving image collection function of the camera 190 is activated, the audio module may be automatically activated. An audio collected by the audio module may be linked and stored with a collected video.

The display 150 may include, for example, a liquid crystal display (LCD), a light emitting diode (LED) display, an organic LED (OLED) display, a microelectromechanical systems (MEMS) display, or an electronic paper display. The display 150 may display, for example, a variety of content (e.g., text, images, videos, icons, or symbols, and the like) to the user. The display 150 may include a touch screen, and may receive, for example, touch, gesture, proximity, or a hovering input using an electronic pen or a part of a body of the user.

According to various embodiments of the present disclosure, the display 150 may output various screens associated with image operation. For example, the display 150 may output a home screen or a waiting screen on which an icon or menu, and the like for activating the camera 190 are disposed. Also, the display 150 may output a preview image obtained in response to activating the camera 190 and an image (e.g., for a still image or for a moving image) captured according to an image collection request. According to various embodiments of the present disclosure, the display 150 may display at least one highlight content. According to various embodiments of the present disclosure, the display 150 may provide a screen for selecting at least one image processing scheme and a screen for displaying grouped images as thumbnail images. According to various embodiments of the present disclosure, the display 150 may provide a setup screen for manually setting or adjusting an image processing scheme corresponding to a set activity mode.

The communication interface 160 may establish communication between, for example, the electronic device 100 and an external device (e.g., an external electronic device 102, an external electronic device 200, or a server device 106). For example, the communication interface 160 may connect to a network 162 through wireless communication or wired communication and may communicate with the external device (e.g., the external electronic device 200 or the server device 106).

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like as a cellular communication protocol. Also, the wireless communication may include, for example, local-area communication. The local-area communication may include, for example, at least one of Wi-Fi communication, Bluetooth (BT) communication, near field communication (NFC), or global positioning system (GPS) communication, and the like. The wired communication may include at least one of, for example, universal serial bus (USB) communication, high definition multimedia interface (HDMI) communication, recommended standard 232 (RS-232) communication, or plain old telephone service (POTS) communication, and the like. The network 162 may include a telecommunications network, for example, at least one of a computer network (e.g., a local area network (LAN) or a wide area network (WAN)), the Internet, or a telephone network.

According to various embodiments of the present disclosure, the communication interface 160 may establish a local-area communication channel with the external electronic device 102. The communication interface 160 may transmit a control signal associated with image capturing of the external electronic device 102 to the external electronic device 102. Also, the communication interface 160 may receive an image captured by the external electronic device 102. The communication interface 160 may transmit highlight content generated using the image received from the external electronic device 102 or highlight content generated using an image captured by the camera 190 to the external electronic device 102.

According to various embodiments of the present disclosure, the communication interface 160 may transmit generated highlight content to the external electronic device 200 and/or the server device 106. Alternatively, the communication interface 160 may receive highlight content from the external device 200 and/or the server device 106.

Each of the external electronic devices 102 and 200 may be the same as or different device from the electronic device 100. The server device 106 may include a group of one or more servers. According to various embodiments of the present disclosure, all or some of operations executed in the electronic device 100 may be executed in another electronic device or a plurality of electronic devices (e.g., one or more of the external electronic devices 102 and 200 and the server device 106). According to an embodiment of the present disclosure, if performing any function or service automatically or according to a request, the electronic device 100 may request another device (e.g., one of the external electronic devices 102 and 200 and the server device 106) to perform at least a partial function associated with the function or service, rather than executing the function or service for itself. The other electronic device (e.g., one of the external electronic devices 102 and 200 and the server device 106) may execute the requested function or the added function and may transmit the executed result to the electronic device 100. The electronic device 100 may use the received result without change or perform additional processing in responding to the requested function or service. For this purpose, for example, cloud computing technologies, distributed computing technologies, or client-server computing technologies may be used.

The camera 190 may collect an image in response to a request by the image operation module 180 and may provide the collected image. According to an embodiment of the present disclosure, if a highlight content providing function is activated, the camera 190 may be activate d and capture an image a predetermined number of times during a predetermined time. Alternatively, the camera 190 may capture an image (e.g., a still image or a video) in response to a user pressing a shutter button (or a virtual shutter button) and may transmit the captured image to the image operation module 180. If the highlight content providing function is finished, the camera 190 may automatically be deactivated. Alternatively, if an input signal associated with ending the camera 190 is received, the camera 190 may also be deactivated.

The image operation module 180 may control image acquisition and processing associated with the highlight content providing function. For example, the image operation module 180 may control activation of the camera 190 and collection of an image via a menu or icon associated with the highlight content providing function, where a user may request the highlight content providing function via the menu or icon. Also, the image operation module 180 may collect information about an image collection environment and may analyze an activity according to the image collection environment. The image operation module 180 may select an image processing scheme to be applied in response to the analyzed activity and may classify and process images according to the selected image processing scheme to generate grouped images. The image operation module 180 may also control generation of highlight content and transmission and output or storage of generated highlight content according to the grouped images.

Figure 2A:
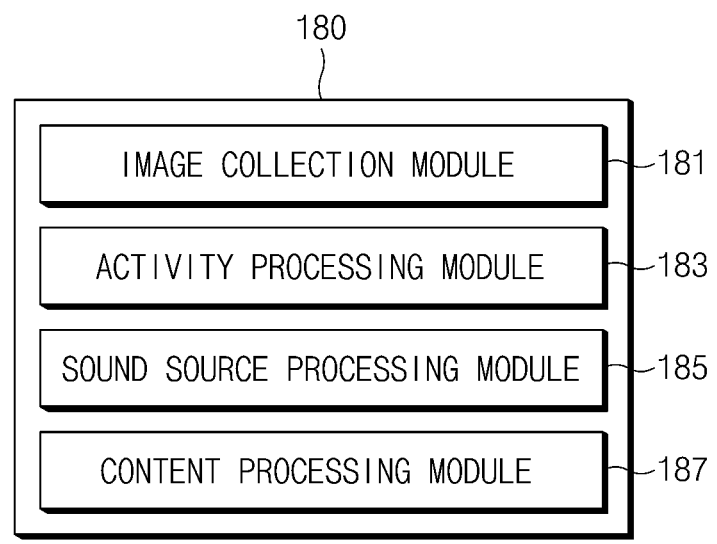
FIG. 2A is a block diagram illustrating a configuration of an image operation module according to various embodiments of the present disclosure.
Figure 2B:
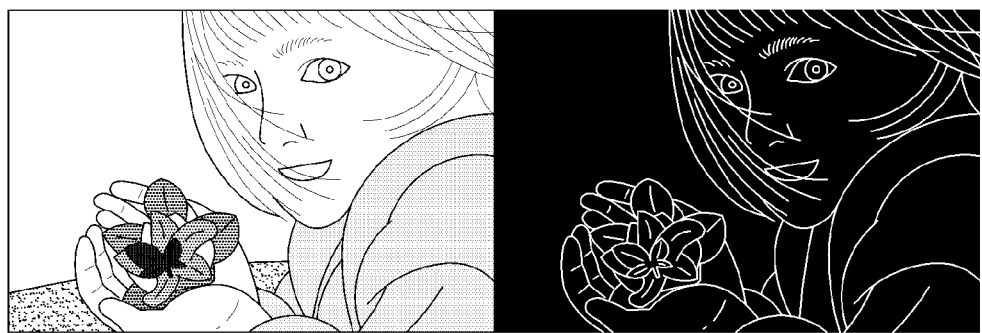
FIG. 2B is a drawing illustrating an example in which a quality filter (QF) based on edge processing is applied according to various embodiments of the present disclosure.
Figure 2C:
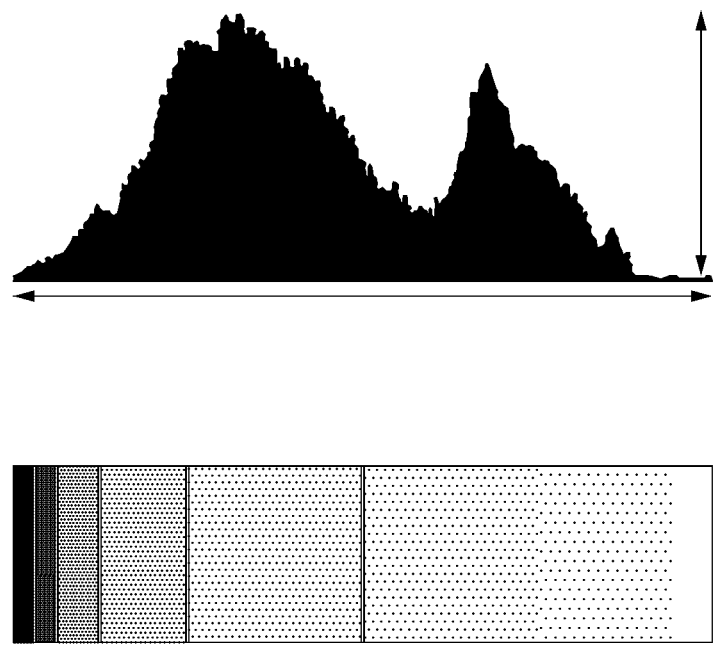
FIG. 2C is a drawing illustrating an example in which a quality filter (QF) based on pixel distribution processing is applied according to various embodiments of the present disclosure.

FIG. 2A is a block diagram illustrating a configuration of an image operation module according to various embodiments of the present disclosure. FIG. 2B is a drawing illustrating an example in which a quality filter (QF) based on edge processing is applied according to various embodiments of the present disclosure. FIG. 2C is a drawing illustrating an example in which a QF based on pixel distribution processing is applied according to various embodiments of the present disclosure.

Referring to FIG. 2A, an image operation module 180 may include an image collection module 181, an activity processing module 183, a sound source processing module 185, and a content processing module 187.

The image collection module 181 may obtain (or collect) an image (e.g., a still image or a video). For example, the image collection module 181 may activate a camera 190 in response to occurrence of an input event and may obtain a still image or a video, and the like. According to various embodiments of the present disclosure, after the camera 190 is activated, the image collection module 181 may automatically obtain an image at constant time intervals during a predetermined time. Accordingly, if the camera 190 is activated, the image collection module 181 may obtain one or more images according to shutter input. Alternatively, the image collection module 181 may capture a video for a predetermined period of time according to occurrence of an input event, and may further capture still images from the video. The image collection module 181 may transmit collected images to the content processing module 187. Alternatively, the image collection module 181 may transmit at least some of the collected images to the activity processing module 183.

The activity processing module 183 may collect a sensor signal from a sensor included in an electronic device 100 of FIG. 1 or a sensor included in an external electronic device connected with the electronic device 100. The activity processing module 183 may analyze at least one of motion, position, or gesture input to the electronic device 100 or the external electronic device according to the collected sensor signal. The activity processing module 183 may determine an activity type according to the analyzed result.

According to various embodiments of the present disclosure, the activity processing module 183 may analyze an image provided from the image collection module 181 and may determine an activity type. For example, the activity processing module 183 may analyze motion in collected images. Motion distance or speed of at least one object included in an image may be estimated by comparing the object in two or more successive still images or frames of a video. Alternatively, the activity processing module 183 may analyze a difference between frames of collected images. This may be referred to as difference analysis. For example, if a plurality of images is transmitted, the activity processing module 183 may analyze a degree of change of each of the images. Alternatively, the activity processing module 183 may analyze a specific object, for example, a person included in a collected image. This may be referred to as difference change analysis of objects. For example, the activity processing module 183 may analyze face size, facial expression, or an angle of shot of the person included in the image.

According to various embodiments of the present disclosure, the activity processing module 183 may analyze activity according to predetermined schedule information or a user input. For example, the activity processing module 183 may collect at least one of situation type information (e.g., text input information for expressing a specific situation) input through an input and output interface 170 of the electronic device 100, user profile information, or stored schedule information. The user profile information may include, for example, weather information and time information of an area where a user is located, a gender of the user, an age of the user, and the like. The stored schedule information may include, for example, alarm time information, business schedule information, rest schedule information, walk schedule information, conference schedule information, meeting schedule information, closing (or checking out) schedule information, attendance schedule information and the like. The activity processing module 183 may determine an activity type according to collected information. The activity processing module 183 may transmit information about the determined activity type to the content processing module 187.

The sound source processing module 185 may collect sound source while the image collection module 181 collects an image, or may analyze the collected sound source and may replace (or swap) the analyzed sound source with a predetermined sound source. For example, while the image collection module 181 collects an image, the activity processing module 183 may activate a microphone to record sound (this can also be said to "collect sound."). Recordings of sound may be referred to as sound source. The activity processing module 183 may provide the collected sound source to the content processing module 187. According to various embodiments of the present disclosure, if the sound source collected through the microphone does not meet a predetermined condition, for example, if a sound source of a constant decibel range is not collected during a predetermined time or at intervals of a predetermined time, the sound source processing module 185 may provide a predetermined sound source to the content processing module 187. For example, the sound source processing module 185 may provide a specific music file or a specific rhythm file, and the like to the content processing module 187.

According to various embodiments of the present disclosure, the sound source processing module 185 may compare the collected sound source with stored audio data while performing image collection process, and may provide any appropriate sound source found to the content processing module 187. In this operation, the sound source processing module 185 may compare the collected sound source with audio data stored in the electronic device 100 and may search for audio data that may at least partially match the collected sound source. Alternatively, the sound source processing module 185 may provide the collected sound source to a server device 106 of FIG. 1 through a communication interface 160 of FIG. 1 and may receive a matching audio data from the server device 106. While "audio data" and "sound source" may be synonymous, the two terms are used to lessen confusion. When both terms are used in the same sentence, the important descriptor in distinguishing usage is "stored" or "collected."

According to various embodiments of the present disclosure, when generating a background sound source, the sound source processing module 185 may select a sound source in consideration of collected music or an activity type (e.g., various factors such as activity contents, a place, weather, an area, and popular music). According to various embodiments of the present disclosure, the sound source processing module 185 may select a sound source as a background sound source of highlight content for the obtained images.

The content processing module 187 may filter received images according to an activity type. For example, the content processing module 187 may apply at least one of a quality filter (QF), a duplicate filter (DF), or a classification filter (CF) (e.g., a face, an object, or a scene) in various manners according to an activity type. For example, in connection with applying the quality filter (QF), the content processing module 187 may measure a degree of blurring through edge detection and may measure illumination through a measured pixel distribution.

According to an embodiment of the present disclosure, in connection with applying the QF, as shown in FIG. 2B, the content processing module 187 may detect an edge on an image. If blurring occurs because dividing lines of an image are not clear, the number of detected edges may be decreased. Therefore, the content processing module 187 may detect a blurring quantity or a blurring quality in a corresponding image relative to the number of edges detected from the specific image.

According to various embodiments of the present disclosure, in connection with applying the QF, as shown in FIG. 2C, the content processing module 187 may measure pixel distribution. The content processing module 187 may determine an overall illumination value of a predetermined image through the pixel distribution (or a histogram). For example, the content processing module 187 may determine the specific image as a bright image overall when there are more peak values on the right side in FIG. 2C. When there are more peak values on the left side in FIG. 2C, the content processing module 187 may determine the specific image as a dark image.

In connection with applying the duplicate filter (DF), the content processing module 187 may measure a duplicate image through feature-based descriptor matching and may perform duplication detection. In connection with the DF, the content processing module 187 may adjust a duplicate degree (e.g., a threshold value for determining duplication) according to an activity type. If the duplicate degree is adjusted, the number of frames filtered by the DF may be changed.

In connection with the classification filter (CF), the content processing module 187 may perform image classification using a learning-based image classification algorithm. The content processing module 187 may select meaningful images using object (e.g., car, person, and the like) classification and scene (e.g., forest, coast, city, and the like) classification. The content processing module 187 may perform content grouping (CG) for received images. For example, the content processing module 187 may classify the received images by applying a time or place based grouping algorithm to the received images.

According to various embodiments of the present disclosure, in connection with a type (e.g., a still image or a moving image) of content to be generated, the content processing module 187 may apply a highlight content generating method according to an activity type in a different way. For example, if generation of video highlight is set or requested, the content processing module 187 may perform video multiplexing or transcoding (i.e., decoding a video and then encoding the decoded video in another format) based on a specific frame of video relative to a filtered keyframe. According to various embodiments of the present disclosure, the content processing module 187 may add a predetermined image transition effect between obtained images and may encode the images into a video to generate highlight video content. Also, the content processing module 187 may extract only images or frames at constant time intervals from an original image or an original moving image and may encode the extracted images or frames into a video to generate highlight video content. Therefore, the content processing module 187 may quickly provide a highlight video content from a long video. According to various embodiments of the present disclosure, the content processing module 187 may use sound source transmitted from the sound source processing module 185 as a background sound source of generated highlight content.

According to various embodiments of the present disclosure, the electronic device 100 may include at least one of a camera configured to capture a plurality of images, a communication interface configured to receive a plurality of images, a memory configured to store the images, and a processor configured to be functionally connected to the memory. The processor may determine an activity type at a time when the images are obtained, may detect at least some of the plurality of obtained images using an image processing scheme corresponding the activity type, and may generate highlight content using the detected images.

As described above, according to various embodiments of the present disclosure, the electronic device may include at least one of a camera configured to capture a plurality of image or a communication interface configured to receive a plurality of images and an image operation module configured to determine an activity type associated with the electronic device at a time when the images are obtained, to detect at least some of the plurality of obtained images using an image processing scheme corresponding to the activity type, and to generate highlight content using the detected images.

According to various embodiments of the present disclosure, the image operation module may determine the activity type associated with the electronic device according to at least one of a difference analysis of the plurality of images or a difference change analysis of objects included in the images.

According to various embodiments of the present disclosure, the image operation module may determine the activity type associated with the electronic device according to at least one of sensor information associated with the electronic device or sensor information received from an external electronic device which transmits the plurality of images.

According to various embodiments of the present disclosure, the image operation module may determine the activity type associated with the electronic device according to at least one of context information stored in a memory of the electronic device or context information stored in an external electronic device which transmits the plurality of images.

According to various embodiments of the present disclosure, the image operation module may obtain at least one of alarm time information, business schedule information, rest schedule information, walking schedule information, meeting schedule information, closing schedule information, attendance schedule information or conference schedule information among information stored in a memory of the electronic device as the context information.

According to various embodiments of the present disclosure, the image operation module may select an image processing scheme in which whether to apply at least one of a QF, a DF, or a CF is set in a different way or an image processing scheme in which a parameter of at least one of the QF, the DF, or the CF is set in a different way, according to the activity type.

According to various embodiments of the present disclosure, the image operation module may generate highlight content by applying the selected image processing scheme in the same way in a predetermined constant time or a predetermined constant position.

According to various embodiments of the present disclosure, the image operation module may generate the highlight content according to the plurality of images received from a wearable electronic device wirelessly connected with the electronic device.

According to various embodiments of the present disclosure, the image operation module may control an output of at least one of information about the determined activity type, the selected image processing scheme, or display information associated with the highlight content.

According to various embodiments of the present disclosure, the image operation module may change at least one of the determined activity type information or the image processing scheme in response to a user input and may control re-generation of highlight content in response to the change.

Figure 3:
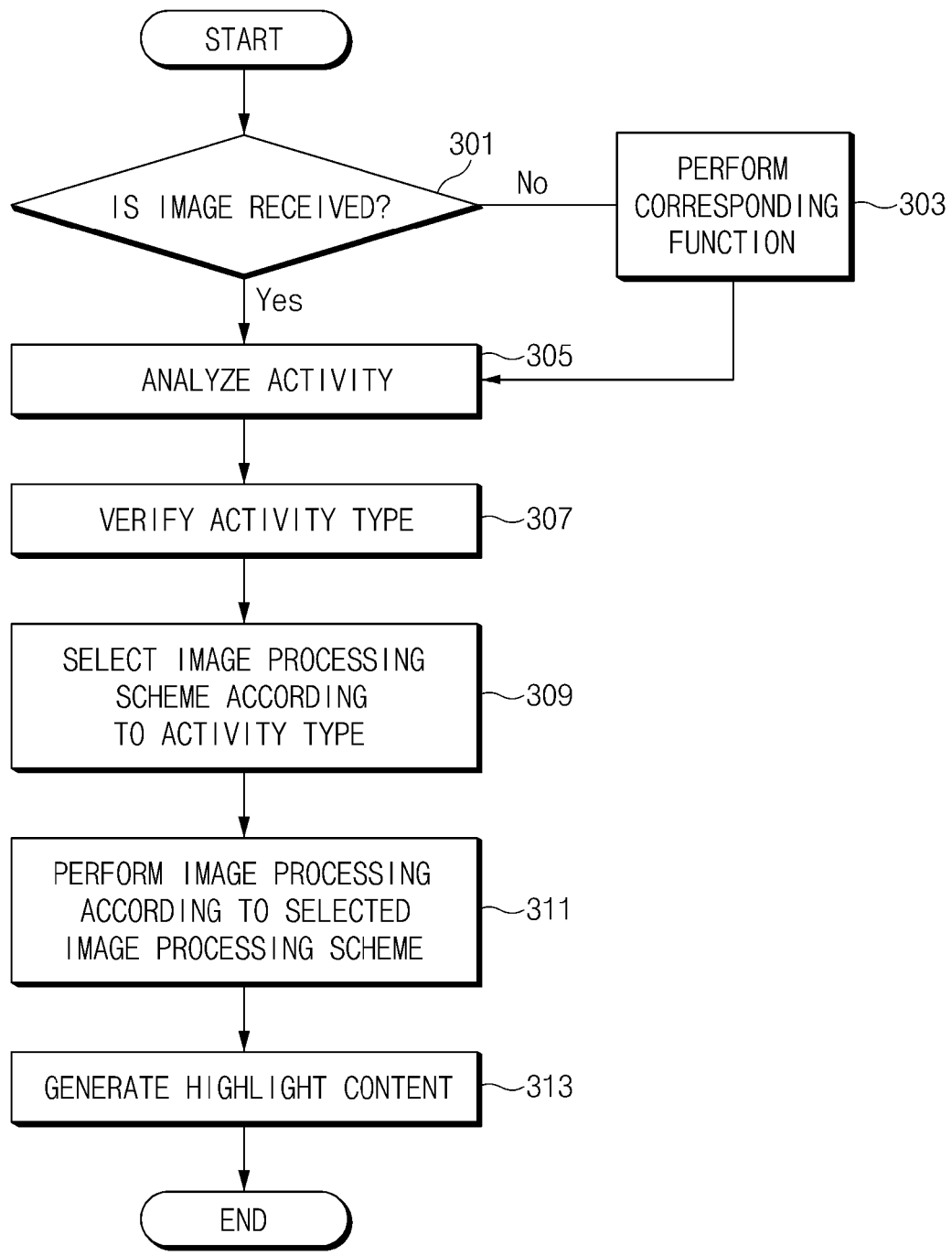
FIG. 3 is a flowchart illustrating an image processing method according to various embodiments of the present disclosure.

FIG. 3 is a flowchart illustrating an image processing method according to various embodiments of the present disclosure.

Referring to FIG. 3, in operation 301 of the image processing method, an image operation module 180 of an electronic device 100 of FIG. 1 may determine whether an image is received. In this regard, the image operation module 180 may controls activation of a camera 190 or may establish a communication channel for receiving an image from an external electronic device. If the image is not received, the image operation module 180 may perform in operation 303 a function corresponding to a currently generated event or a set scheduling event. For example, the image operation module 180 may support an image search function, a function of searching for stored highlight content, a function of sharing stored highlight content according to a type of a user input, or may generate an image by taking a picture or a video.

If the image is received, the image operation module 180 may analyze an activity in operation 305. For example, if an image is received from the camera 190 or if an image is received from an external electronic device (e.g., a wearable device linked with the electronic device 100), the image operation module 180 may analyze activity of the electronic device 100 or the external electronic device. In connection with analyzing the activity, the image operation module 180 may analyze, for example, a change of at least one object in the collected images. Alternatively, when the external electronic device or the camera 190 is activated, the image operation module 180 may activate at least one sensor (e.g., a sensor included in the electronic device 100 or a sensor included in the external electronic device). The image operation module 180 may analyze a motion state, a surrounding illumination state, a position, and the like of the electronic device 100 or the external electronic device according to sensor information provided from a sensor. Alternatively, the image operation module 180 may analyze context information according to information (e.g., schedule information, promise information, anniversary information, business information, meeting schedule information, closing schedule information, attendance schedule information and the like) stored in a memory 130.

In operation 307, the image operation module 180 may verify an activity type. For example, the image operation module 180 may verify an activity type corresponding to at least one of image analysis information, sensor analysis information, or context information stored in the memory 130. According to an embodiment of the present disclosure, the image operation module 180 may verify types of a walking activity, a running activity, a vehicle movement activity, a night situation activity, a rain situation activity, a specific position activity, and the like.

In operation 309, the image operation module 180 may select an image processing scheme according to the activity type. The image operation module 180 may select an image processing scheme mapped with the verified activity type. In this regard, the image operation module 180 may store and manage a mapping list that stores information about an image processing scheme for each activity type. If the activity is verified, the image operation module 180 may determine whether to apply any image processing scheme with reference to the mapping list. According to an embodiment of the present disclosure, the mapping list may include image processing schemes in which a filter parameter (e.g., a threshold value applied to at least one of a QF, a DF, or a CF) of at least one of the QF, the DF, or the CF is defined in a different way according to an activity type.

In operation 311, the image operation module 180 may perform image processing according to the selected image processing scheme. For example, the image operation module 180 may classify and select collected images in a different way according to a degree of a filter defined in the selected image processing scheme. According to an embodiment of the present disclosure, the image operation module 180 may process the images according to a degree of a QF, a DF, or a CF of an image processing scheme.

In operation 313, the image operation module 180 may generate highlight content. For example, the image operation module 180 may sequentially arrange selected images to generate highlight content as a moving image. Alternatively, the image operation module 180 may generate a slide highlight content that shows each selected image for a predetermined time interval. The slide highlight content may also include, for example, an image transition effect between selected images.

Figure 4:
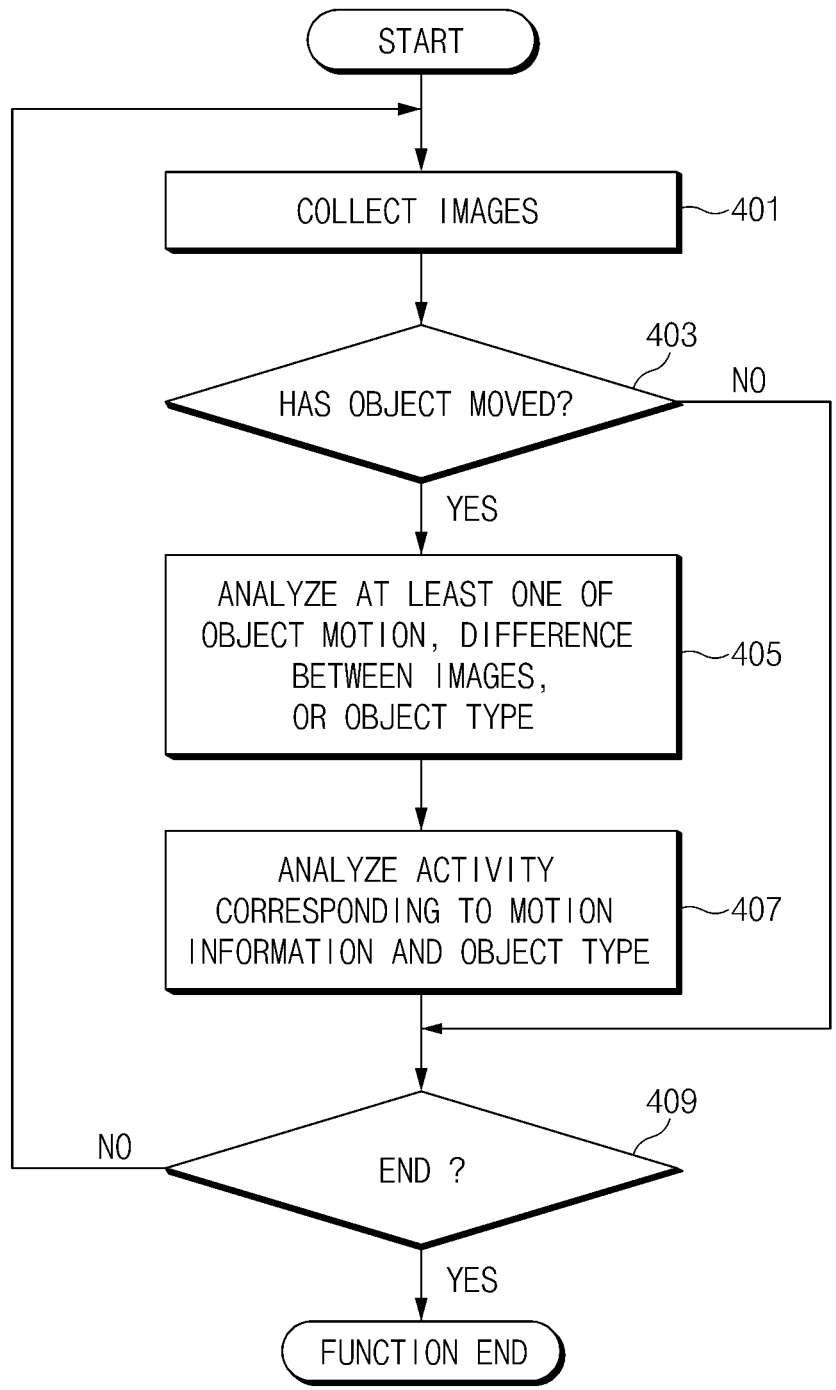
FIG. 4 is a flowchart illustrating an activity analysis method using an image according to various embodiments of the present disclosure.

FIG. 4 is a flowchart illustrating an activity analysis method using an image according to various embodiments of the present disclosure.

Referring to FIG. 4, in the activity analysis method, in operation 401, an image operation module 180 in the electronic device 100 of FIG. 1 may collect images. In this regard, the image operation module 180 may activate a camera 190 or may establish a communication channel with an external electronic device 102 to receive images. According to various embodiments of the present disclosure, the image operation module 180 may receive images stored in the external electronic device 102.

In operation 403, the image operation module 180 may determine whether an object has moved. For example, the image operation module 180 may compare collected images to determine whether an object in the collected images has moved by a predetermined value or more. Alternatively, the image operation module 180 may determine whether a change in pose for least one object included in the images is by a predetermined value or more.

In operation 405, the image operation module 180 may analyze at least one of object motion, a difference between images, or an object type. If there is an image difference corresponding to object motion, the image operation module 180 may analyze motion of object(s) in the images, a difference between images, or an object type, and may detect motion information, the object type, and the like. For example, the image operation module 180 may detect whether an object has moved in any direction. Also, the image operation module 180 may detect whether a predetermined object (e.g., a person, a face, and the like) is included in an image.

In operation 407, the image operation module 180 may analyze an activity corresponding to the motion information and the object type. For example, the image operation module 180 may verify whether a user who possesses the electronic device 100 is walking, running, or falling according to motion information from the electronic device 100. Alternatively, the image operation module 180 may verify whether a landscape, a person, or a specific object is captured according to the object type. Accordingly, the image operation module 180 may determine the type of activity such as walking, running, or falling, and/or may determine whether the activity involves a person and/or an object.

In operation 409, the image operation module 180 may determine whether to end the activity analysis. For example, the image operation module 180 may stop activity analysis when image collection has ended. Alternatively, the image operation module 180 may determine whether an event associated with deactivating a photo function occurs.

According to various embodiments of the present disclosure, the image operation module 180 may analyze an activity using sensor data, context data, and the like, as well as by using image analysis. For example, the image operation module 180 may recognize user activity of an image or video by sensor data of time, place, user context data, and the like, and may control the process associated with generating highlight content. The user context data may include capture start and end information set by a user, and information about an explicitly defined activity type. The capture start and end time may be used in content grouping processing. For example, if a capture start and a capture end are set, grouping may be skipped. If the capture start and the capture end are not set, the image operation module 180 may group obtained highlight images or obtained highlight content according to at least one of position, time, or some image characteristic(s).

Figure 5:
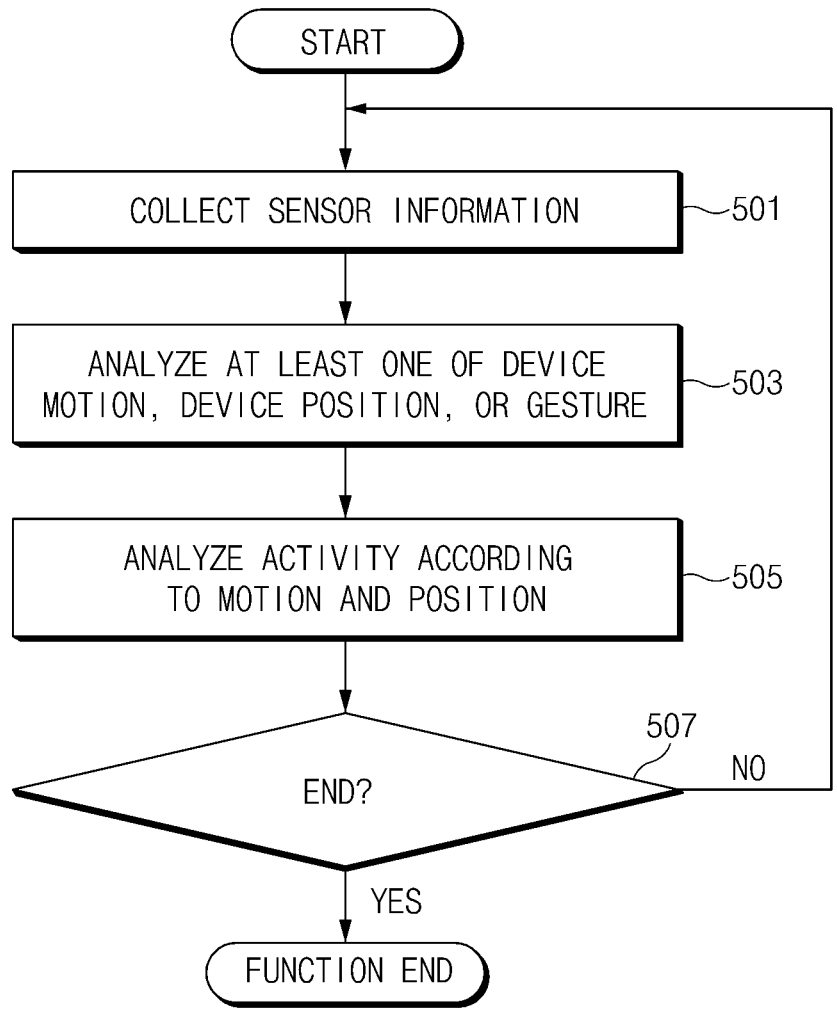
FIG. 5 is a flowchart illustrating an activity analysis method using sensor information according to various embodiments of the present disclosure.

FIG. 5 is a flowchart illustrating an activity analysis method using sensor information according to various embodiments of the present disclosure.

Referring to FIG. 5, in operation 501 of the activity analysis method an image operation module 180 in the electronic device 100 of FIG. 1 may collect sensor information. According to an embodiment of the present disclosure, when a camera 190 is activated or when an image is received from an external electronic device 102 of FIG. 1, the image operation module 180 may activate at least one sensor. Alternatively, the operation module 180 may receive sensor information together with the image from the external electronic device 102.

In operation 503, the image operation module 180 may analyze at least one of device motion, device position, or gesture. For example, the image operation module 180 may analyze motion direction or motion degree (e.g., speed, acceleration, and the like) of at least one of the electronic device 100 or the external electronic device 102. Also, the image operation module 180 may analyze a position change or a current position of the electronic device 100 or the external electronic device 102 according to the sensor information. Also, the image operation module 180 may analyze a gesture (e.g., a swing gesture, a tap gesture, a turn gesture, or a tilt gesture, and the like) according to device motion within a constant time according to sensor information.

In operation 505, the image operation module 180 may analyze an activity according to the motion and the position. For example, the image operation module 180 may determine a moving means (e.g., walking, bicycle, motorcycle, vehicle, and the like) that may be associated with the activity according to the speed or acceleration of the electronic device 100 or the external electronic device 102, or the motion direction of the electronic device 100 or the external electronic device 102. The image operation module 180 may also be able to determine that the activity may be mountain hiking based on altitude information and movement information, or an exercise activity (e.g., swimming, tennis, golf, table tennis, baseball, and the like activities), and the like according to motion, a position, or a gesture. If the activity type is determined, the image operation module 180 may select a suitable image processing scheme to generate highlight content.

In operation 507, the image operation module 180 may determine whether an end event occurs. If the end event does not occur, the image operation module 180 may repeat the operations from operation 501. When the end event occurs, the image operation module 180 may end (or terminate) the generation of the highlight content and may end the collection of the sensor information.

Figure 6:
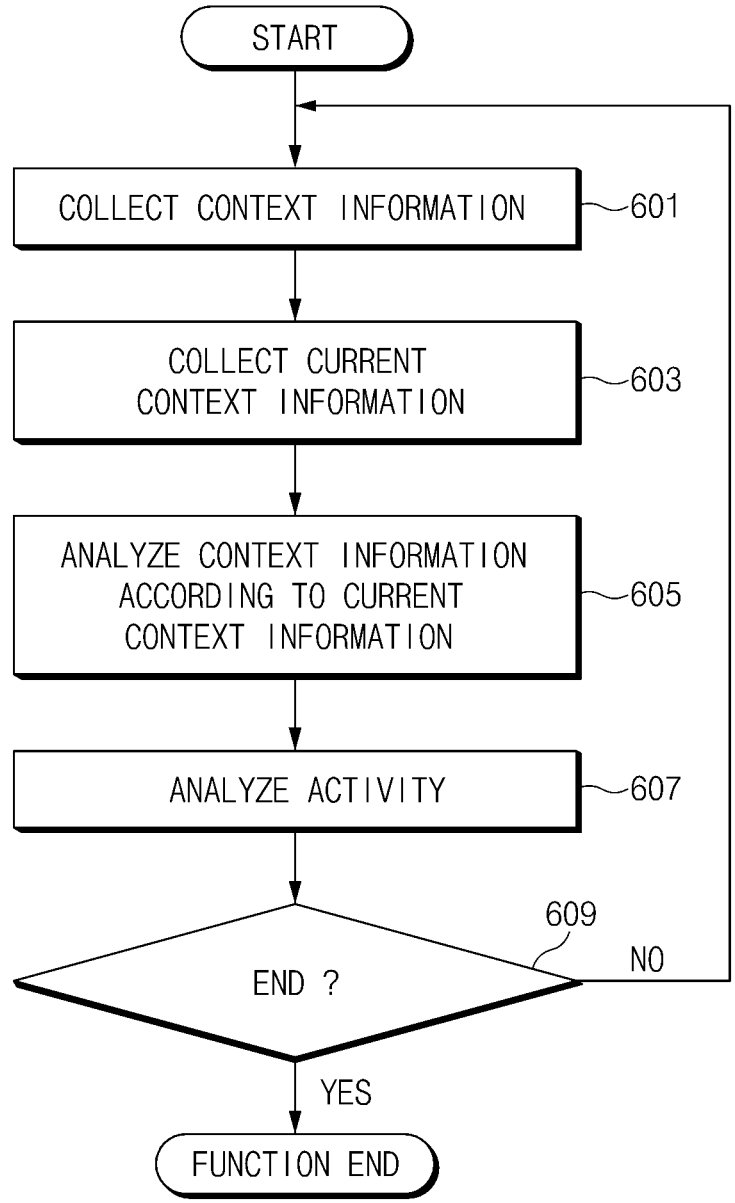
FIG. 6 is a flowchart illustrating an activity analysis method using context information according to various embodiments of the present disclosure.

FIG. 6 is a flowchart illustrating an activity analysis method using context information according to various embodiments of the present disclosure.

Referring to FIG. 6, in operation 601 of the activity analysis method, an image operation module 180 of the electronic device 100 of FIG. 1 may collect context information. For example, the image operation module 180 may search through memory 130 for schedule information, memos text messages or chat messages, emails, alarms, and the like. These types of information may be stored in certain files in memory 130, where some of those files may have been identified by file names or application names. The information may also be stored in certain address ranges of memory 130. Accordingly, the image operation module 180 may search through certain address ranges of memory 130 or through certain files in memory 130 for a term corresponding to a predetermined keyword (e.g., a term associated with at least one of a person, a time, or a position). The image operation module 180 may collect context information associated with a specific time, position, person, and the like according to terms corresponding to a keyword.

In operation 603, the image operation module 180 may collect current context information. For example, the image operation module 180 may collect current position information of an electronic device 100 (or an external electronic device 102 of FIG. 1) and information about a current time. According to various embodiments of the present disclosure, the image operation module 180 may scan an area around the electronic device 100 and may collect information of an external electronic device 200 of FIG. 1, which may be registered in connection with a predetermined person.

In operation 605, the image operation module 180 may analyze context information according to the current context information. For example, the image operation module 180 may verify whether time information, position information, and person information included in the context information obtained in operation 601 are identical to time information, position information, and person information obtained in a current context within some predetermined error range. If the current context information is identical to the context information within the error range, the image operation module 180 may determine that a context according to the current context information is performed.

In operation 607, the image operation module 180 may analyze an activity. For example, the image operation module 180 may assign an activity type according to the context information. According to an embodiment of the present disclosure, the image operation module 180 may determine, for example, a meeting activity, a conference activity, a business trip activity, a closing activity, an attendance activity, and the like according to context information. The image operation module 180 may set start and end times for another capture (or another image acquisition interval) according to each activity. This is just one embodiment of the disclosure for an image processing scheme. The image operation module 180 may use various other image processing schemes for processing images.

In operation 609, the image operation module 180 may determine whether an end event occurs. The image operation module 180 may determine whether an event associated with deactivating a highlight content generation function has occurred. If the event associated with deactivating the highlight content generation function occurs, the image operation module 180 may end the collection and analysis of the context information.

Figure 7A:
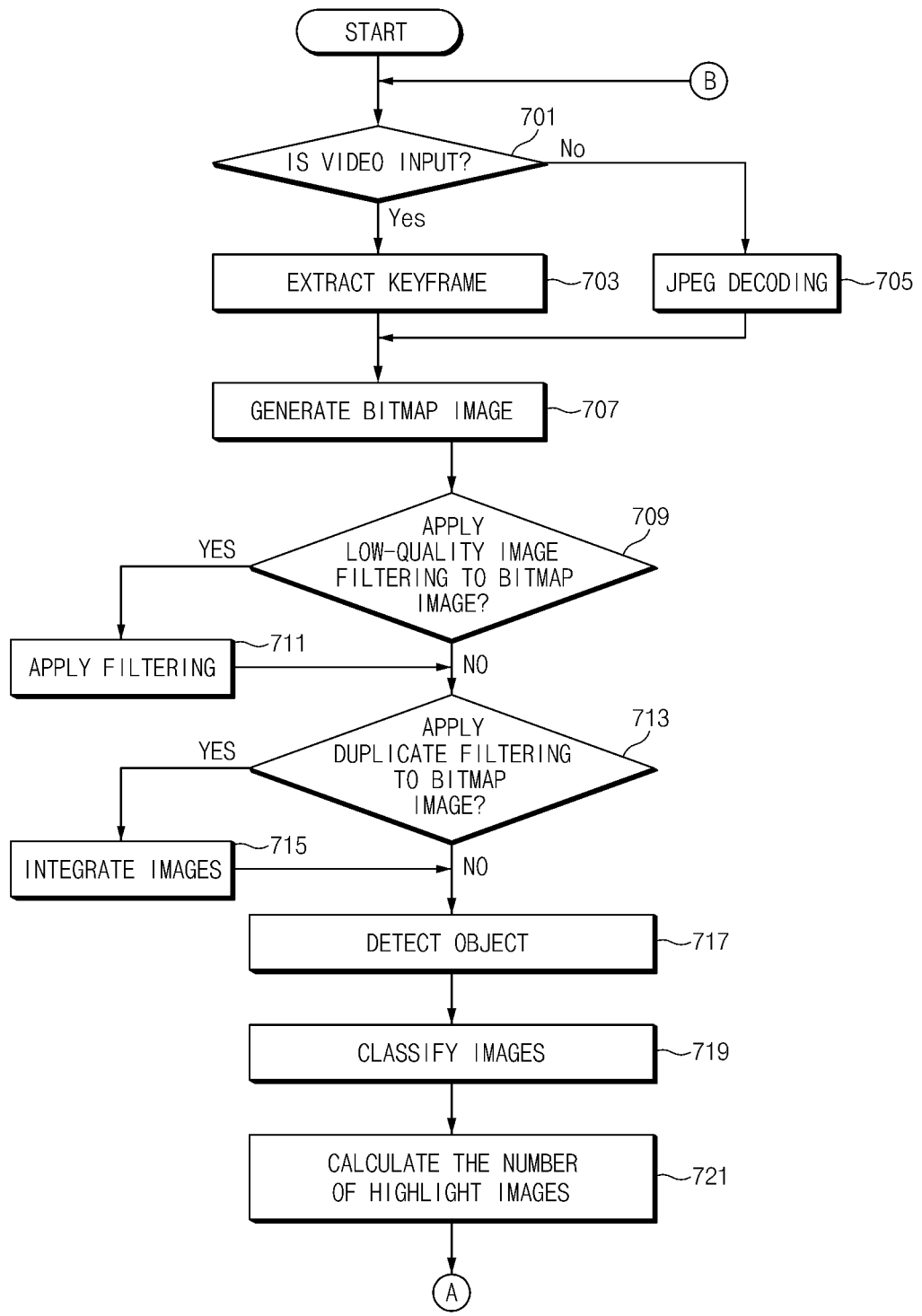
FIG. 7A is a flowchart illustrating a highlight image collection method according to various embodiments of the present disclosure.

FIG. 7A is a flowchart illustrating a highlight image collection method according to various embodiments of the present disclosure.

Referring to FIG. 7A, if an activity type is determined and if an image processing scheme is determined according to the activity type, an image operation module 180 in the electronic device 100 of FIG. 1 may determine in operation 701 whether a video has been input in connection with collecting highlight images. For example, the image operation module 180 may determine whether a video (e.g., a moving image) is input from a camera 190 or whether a video has been received from an external electronic device 102 of FIG. 1. A way of determining an activity type may be determined according to at least one of the above-mentioned methods of FIGS. 4 to 6.

If video is input, in operation 703, the image operation module 180 may extract a keyframe. If a still image is input rather than a video, then the process may go to operation 705 where the image operation module 180 may perform decoding for a still image by using, for example, joint photographic experts group (JPEG) decoding of the input still image. In operation 707, the image operation module 180 may generate a bitmap image. For example, the image operation module 180 may convert the extracted keyframe into a bitmap image. Alternatively, the image operation module 180 may convert the JPEG-decoded image into a bitmap image.

In operation 709, the image operation module 180 may determine whether the bitmap image needs low-quality image filtering. For example, the image operation module 180 may determine whether resolution of the bitmap image is greater than a predetermined value. Alternatively, the image operation module 180 may determine whether a region is present where pixel breaking, pixel spreading, pixel blurring, and the like occur in the bitmap image by more than a predetermined threshold. A parameter (e.g., a parameter of defining a degree of quality) of the low-quality image filtering may be determined in different ways according to an activity type.

If low-quality image filtering is needed, then the image operation module 180 may apply the low-quality image filtering to the bitmap image in operation 711. An option may be for the image operation module 180 to exclude the corresponding bitmap image from being used to generate highlight content.

In operation 713, the image operation module 180 may determine whether the bitmap image needs duplicate filtering. In this regard, the image operation module 180 may determine whether there is enough similarity between the present bitmap image and another bitmap image (e.g., a previously obtained highlight image). For example, the image operation module 180 may determine a degree of similarity between a currently obtained image and another image. If the degree of the similarity is greater than a predetermined threshold, then the images may be deemed to be duplicates. The determination of similarity between two images may be determined in different ways according to an activity type.

If duplicate filtering is needed for the bitmap image (e.g., if the degree of similarity is greater than a threshold), the image operation module 180 may integrate (combine or merge) the images in operation 715. For example, the image operation module 180 may integrate an obtained image with another highlight image when the two images have been determined to be duplicates. Alternatively, the image operation module 180 may mark an obtained image as a duplicate to exclude it from a highlight image.

The image operation module 180 may detect an object in operation 717. For example, if an obtained image is different from highlight by more than a threshold amount, the image operation module 180 may be able to detect at least one object in the obtained image that may be different from the highlight image. After detecting the object, the image operation module 180 may perform image classification in operation 719. For example, the image operation module 180 may classify the image according to a type of the detected object. In this regard, the electronic device 100 may store and manage information about predetermined types of objects such as, for example, a person, a vehicle, a bicycle, and the like, in memory 130. The image operation module 180 may compare feature points of the detected object with objects stored in the memory to determine the type of the detected object. The image operation module 180 may then be able to classify the image.

In operation 721, the image operation module 180 may calculate the number of highlight images. For example, the image operation module 180 may add the number of images classified to be of a type to previously obtained highlight images of the same type (e.g., how many frames are).

As described above, the image operation module 180 may control capturing of an image, such as a still image or a video (e.g., a moving image), and the like, in response to an input event in an environment corresponding to a specific activity type. For example, a user who possesses the electronic device 100 may move at a speed that may fall in certain ranges (e.g., walking speed, running speed, bicycling speed, and the like). If an activity type according to movement is determined, the image operation module 180 may extract an image set from images and videos of the determined activity type. For example, the image operation module 180 may store at least one frame, which remains after filtering is performed, as a highlight image for one frame set.

Figure 7B:
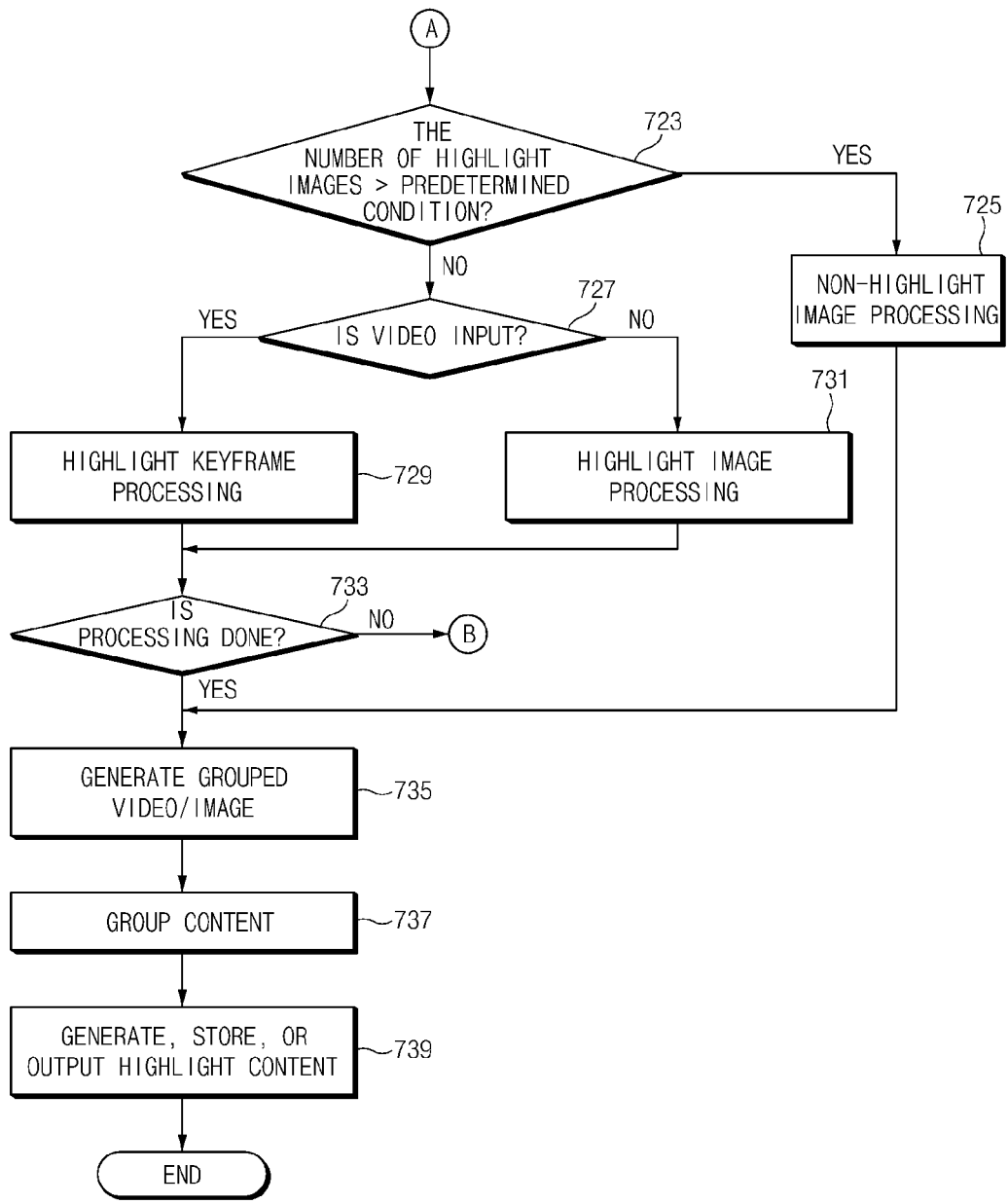
FIG. 7B is a flowchart illustrating a highlight content providing method according to various embodiments of the present disclosure.

FIG. 7B is a flowchart illustrating a highlight content providing method according to various embodiments of the present disclosure.

Referring to FIG. 7B, in operation 723 of the highlight content providing method, the image operation module 180 of the electronic device of FIG. 1 may determine whether the number of highlight images is more than a pre-determined threshold (e.g., a specific range of number). According to an embodiment of the present disclosure, if the number of highlight images exceeds a threshold value set by a user or automatically set, the image operation module 180 may additionally perform a highlight content generation process including filtering described with reference to FIG. 7A. For example, the image operation module 180 may reduce the number of highlight images by adjusting at least one of a parameter of a QF (e.g., a blur degree) or a parameter of a CF (e.g., scene importance of a "person" and importance of a background scene (e.g., a forest scene)). For example, the image operation module 180 may remove a still image or a video by adjusting a filter parameter and adjusting the ratio of the number of all images to the number of highlight images or adjusting a ratio of the number of all images to the number of moving images during the entire activity period.

If the number of the highlight images is more than the predetermined threshold the image operation module 180 may perform non-highlight image processing in operation 725. For example, the image operation module 180 may mark a corresponding image (e.g., at least one highlight image that exceeds the predetermined threshold number) as an image which is not to be a highlight image. The image operation module 180 may exclude these marked images when highlight content is generated.

If the number of the highlight images does not meet the predetermined condition, for example, if it is necessary to obtain additional highlight images because the number of highlight images is less than or equal to the predetermined number of images, the image operation module 180 may determine whether a video is input in operation 727. If the input is video, the image operation module 180 may perform highlight keyframe processing in operation 729. If the input is not video, the image operation module 180 may perform highlight image processing in operation 731. For example, the image operation module 180 may change at least one another image into a highlight image In operation 733, the image operation module 180 may determine whether an event associated with ending the processing occurs. If the event associated with ending the processing does not occur, the image operation module 180 may branch to operation 701 of FIG. 7A and may repeat the operations from operation 701.

If the event associated with ending the processing occurs, in operation 735, the image operation module 180 may generate a grouped video or image. For example, the image operation module 180 may manage highlight images to become one image set. In operation 737, the image operation module 180 may perform content grouping. For example, the image operation module 180 may group highlight image sets according to at least one of time or position. For example, the image operation module 180 may group highlight image sets generated within a predetermined time range into one content. This content of highlight images may be referred to as highlight content. Alternatively, the image operation module 180 may group highlight image sets into one content if positions (or times and positions) are identical to each other within a predetermined range.

In operation 739, the image operation module 180 may generate, store and/or output the highlight content. For example, the image operation module 180 may store highlight content in memory 130 of an electronic device 100 of FIG. 1 or may transmit the highlight content to an external electronic device 102 of FIG. 1 or a predetermined server device.

As described above, according to various embodiments of the present disclosure, the image processing method may include collecting images in the electronic device, determining an activity type of the electronic device at a time when the images are obtained, selecting an image processing scheme having a filtering condition corresponding to the determined activity type among various image processing schemes, processing some of the obtained images by applying the selected image processing scheme, generating highlight content according to the processed data, and outputting or storing the highlight content.

As described above, according to various embodiments of the present disclosure, the image processing method may include collecting images in the electronic device, determining an activity type of the electronic device at a time when the images are obtained, selecting an image processing scheme having a filtering condition corresponding to the determined activity type, selecting or processing some of the obtained images by applying the selected image processing scheme, and generating highlight content according to the selected or processed images.

According to various embodiments of the present disclosure, the determining of the activity type may include determining the activity type associated with the electronic device according to at least one of a difference analysis of images or a difference change analysis of objects included in the images.

According to various embodiments of the present disclosure, the determining of the activity type may include receiving sensor information associated with the electronic device or sensor information from an external electronic device which transmits the images and determining the activity type associated with the electronic device according to the received sensor information.

According to various embodiments of the present disclosure, the determining of the activity type may include collecting context information stored in a memory of the electronic device or collecting context information stored in an external electronic device which transmits the images, and determining the activity type according to the collected context information.

According to various embodiments of the present disclosure, the collecting of the context information may include obtaining at least one of alarm time information, business schedule information, rest schedule information, walking schedule information, meeting schedule information, closing schedule information, attendance schedule information or conference schedule information among information stored in the memory as the context information.

According to various embodiments of the present disclosure, the selecting of the image processing scheme may include selecting an image processing scheme in which whether to apply at least one of a QF, a DF, or a CF is set in a different way or an image processing scheme in which a parameter of at least one of the QF, the DF, or the CF is set in a different way, according to the activity type.

According to various embodiments of the present disclosure, the generating of the highlight content may include generating the highlight content by applying the selected image processing method in the same way in a predetermined constant time or a predetermined constant position.

According to various embodiments of the present disclosure, the generating of the highlight content may include generating the highlight content according to the images received from a wearable electronic device wirelessly connected with the electronic device.

According to various embodiments of the present disclosure, the method may further include outputting at least one of information about the determined activity type, the selected image processing scheme, or display information associated with the highlight content.

According to various embodiments of the present disclosure, the method may further include changing at least one of information about the determined activity type or the image processing scheme in response to a user input and generating highlight content again in response to the change.

Figure 8:
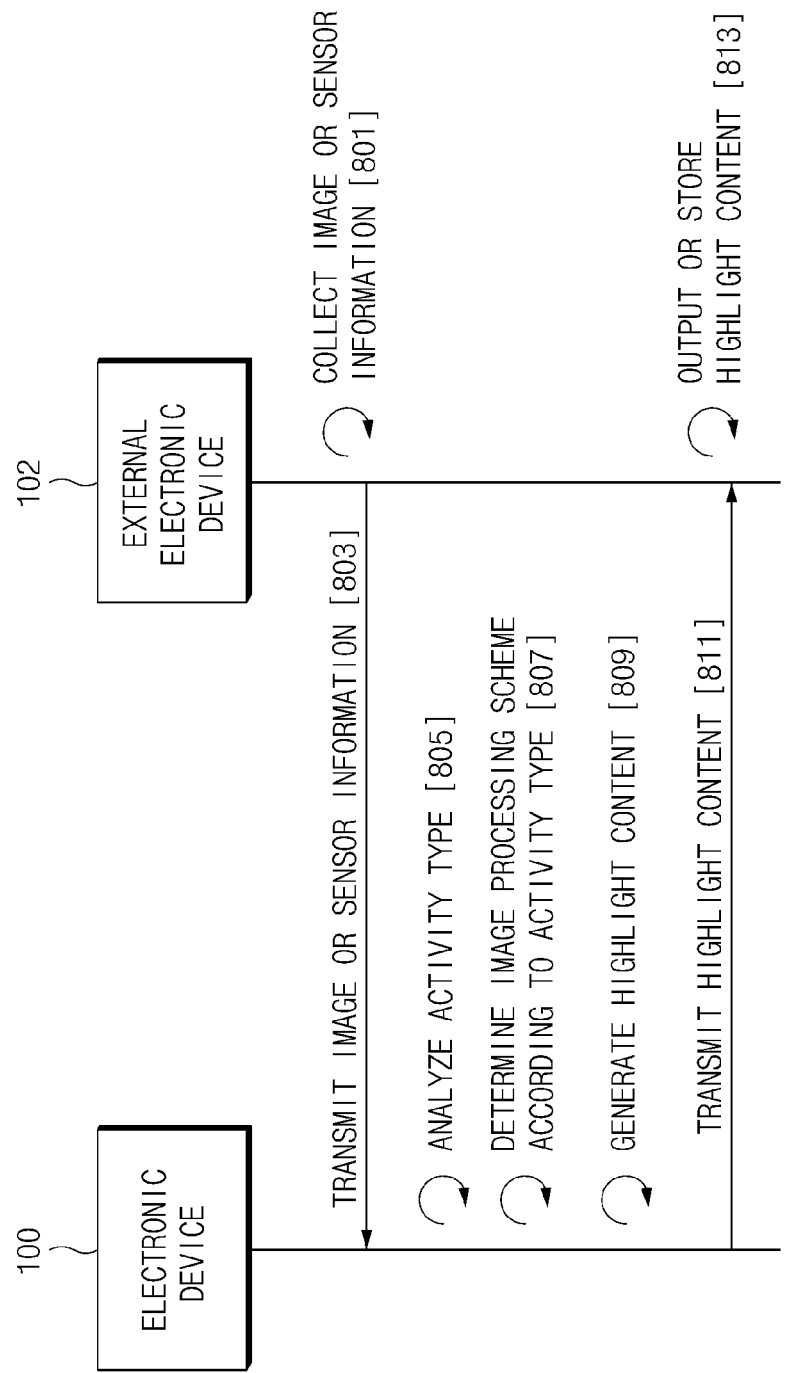
FIG. 8 is a signal sequence diagram illustrating an example of system signal processing associated with image operation according to various embodiments of the present disclosure.

FIG. 8 is a signal sequence diagram illustrating an example of system signal processing associated with image operation according to various embodiments of the present disclosure.

Referring to FIG. 8, in operation 801 of system signal processing associated with the image operation, an external electronic device 102 may collect images or sensor information in response to an input event or a request of an electronic device 100. For example, the external electronic device 102 may activate at least one sensor in response to a user input, may obtain images through its camera, and may collect sensor information.

In operation 803, the external electronic device 102 may transmit the collected images and/or the collected sensor information to the electronic device 100. According to an embodiment of the present disclosure, the external electronic device 102 may collect movement speed information, movement direction information, and the like as sensor information and may transmit the collected sensor information together with obtained images to the electronic device 100.

In operation 805, the electronic device 100 may analyze an activity type. For example, the electronic device 100 may analyze an activity type according to the movement speed information, the movement direction information, and the like provided from the external electronic device 102. According to an embodiment of the present disclosure, the electronic device 100 may determine a walking activity, a running activity, or a bicycle movement activity according to movement speed information, movement direction information, and the like.

If the analysis of the activity type is completed, in operation 807, the electronic device 100 may determine an image processing scheme according to the activity type. For example, the electronic device 100 may determine an image processing scheme configured with filters having predetermined parameters according to the activity type. In this regard, the electronic device 100 may refer to a mapping table that may be stored in memory 130, in which is mapped an image processing scheme according to an activity type.

In operation 809, the electronic device 100 may generate highlight content. For example, the electronic device 100 may sequentially arrange at least one highlight image selected according to the image processing scheme and may encode the highlight image into a video, or may change at least one highlight image to become an image that is sequentially reproduced. For example, the electronic device 100 may make at least one P-frame (Predicted frame) associated with the at least one highlight image. The electronic device 100 may make an sequentially reproduced image using the P frame or combining the P frame and the at least one highlight image.

In operation 811, the electronic device 100 may transmit the highlight content to the external electronic device 102. Additionally or alternatively, the electronic device 100 may output and/or store the highlight content. In operation 813, the external electronic device 102 may output and/or store the received highlight content.

According to various embodiments of the present disclosure, in the image operation method, the description is given of the example in which the activity is analyzed according to the sensor information of the external electronic device 102. However, the scope of the present disclosure may not be limited thereto. For example, in an image operation method according to various embodiments of the present disclosure, an activity analysis may be performed through an image analysis result transmitted from the external electronic device 102. Also, in an image operation method according to various embodiments of the present disclosure, an activity analysis may be performed according to context information stored in a memory of the external electronic device 102.

According to various embodiments of the present disclosure, the description is given of the example in which the analysis of the activity, the determination of the activity type, and the selection of the image processing scheme are performed in the electronic device 100. However, the scope of the present disclosure may not be limited thereto. For example, the processing associated with the activity, the selection of the image processing scheme, and the processing of the images are performed in the external electronic device 102.

As described above, devices according to the image operation method according to various embodiments of the present disclosure may process collected images according to a predetermined image processing scheme that is preset according to an activity type and may generate different highlight content according to the activity type. For example, the electronic device 100 may analyze input data according to a real situation, may evaluate an activity, and may select and apply an image processing scheme in a different way according to collected information.

According to an embodiment of the present disclosure, when a user who possesses the electronic device 100 walks, the image operation module 180 may obtain an image with periodic up-and-down motion at some walking speed. Alternatively, the image operation module 180 may obtain information from an acceleration sensor for a typical speed of about 4 to 5 kilometers per hour. Or, the image operation module 180 may obtain context information which is input as "walking" at a corresponding time in an exercise record or schedule. Accordingly, various embodiments of the present disclosure can use the image operation module 180 to determine that the user is currently walking using an appropriate API.

Once the image operation module 180 determines an activity type as a walking activity according to the above-mentioned input data analysis, the image operation module 180 may select an image processing scheme for the walking activity. For example, the image operation module 180 may roughly perform motion compensation of an image stabilizer. The image operation module 180 may select an image processing scheme including a QF, a DF, and a CF of predetermined parameters in connection with filtering. In connection with content grouping, the image operation module 180 may apply time or place based grouping, may set an absolute time interval between groups to three hours, and may set an absolute distance interval to ten kilometers. Alternatively, the image operation module 180 may process content grouping according to a start/end event generated by a scheduler, a calendar, a health care function, and the like or a start/end event according to a user input. In connection with generating highlight content, the image operation module 180 may generate a time lapse video and may generate images at five minutes intervals in response to determination of the walking activity.

According to various embodiments of the present disclosure, when the user who possesses the electronic device 100 runs, the image operation module 180 may obtain an image in which up-and-down motion occurs at a relatively fast rate. Alternatively, the image operation module 180 may obtain information from an acceleration sensor for a speed of about 10 to 15 kilometers per hour and where there is a regular up-and-down motion and side-to-side motion. Alternatively, the image operation module 180 may obtain context information of "jogging" or "running" at a corresponding time in an exercise record or schedule, where both activities may be referred to as "running."

The image operation module 180 may verify that the user is in a currently running context using an API. Therefore, the image operation module 180 may determine that a running activity occurs. The image operation module 180 may perform motion compensation of an image stabilizer according to the occurrence of the running activity and may select an image processing scheme for applying at least one of a QF, a DF or CF of a predetermined parameter. In connection with content grouping, the image operation module 180 may apply time or place based grouping, may set an absolute time interval between groups to three hours, and may set an absolute distance interval to ten kilometers. Alternatively, in connection with content grouping, the image operation module 180 may receive a start/end event of a related application, for example, a calendar application, a health care application, and the like and may perform grouping processing. In connection with generating highlight content, the image operation module 180 may extract an image set from a video and may configure the highlight content.

According to various embodiments of the present disclosure, when the user plays with a child, the image operation module 180 may obtain an image in which an object is changed a predetermined number of times or more in intervals of a predetermined time and the same object (e.g., the same person) appears consistently. Alternatively, the image operation module 180 may obtain location information in which there is not much change of a location, which is sensed by a position sensor, irregular acceleration sensor information, and irregular gyroscope sensor information. Alternatively, the image operation module 180 may collect context information in which there is no specific user input. Therefore, the image operation module 180 may determine that a normal, non-scheduled activity is occurring. The image operation module 180 may select an image processing scheme including a QF, a DF, and a CF with predetermined parameters. The image operation module 180 may apply time or place based grouping, may set an absolute time interval between groups to three hours, and may set an absolute distance interval to five kilometers. The image operation module 180 may generate highlight content by generating one video per group including an image slide effect.

According to various embodiments of the present disclosure, the electronic device may improve the quality of highlight content by recognizing an activity and adjusting an image processing scheme for generating a highlight image corresponding to the recognized activity and may reduce unnecessary calculations, which leads to reduced battery usage and reduced heating of the electronic device, and allows greater processor availability of the electronic device to other functions.

Figure 9:
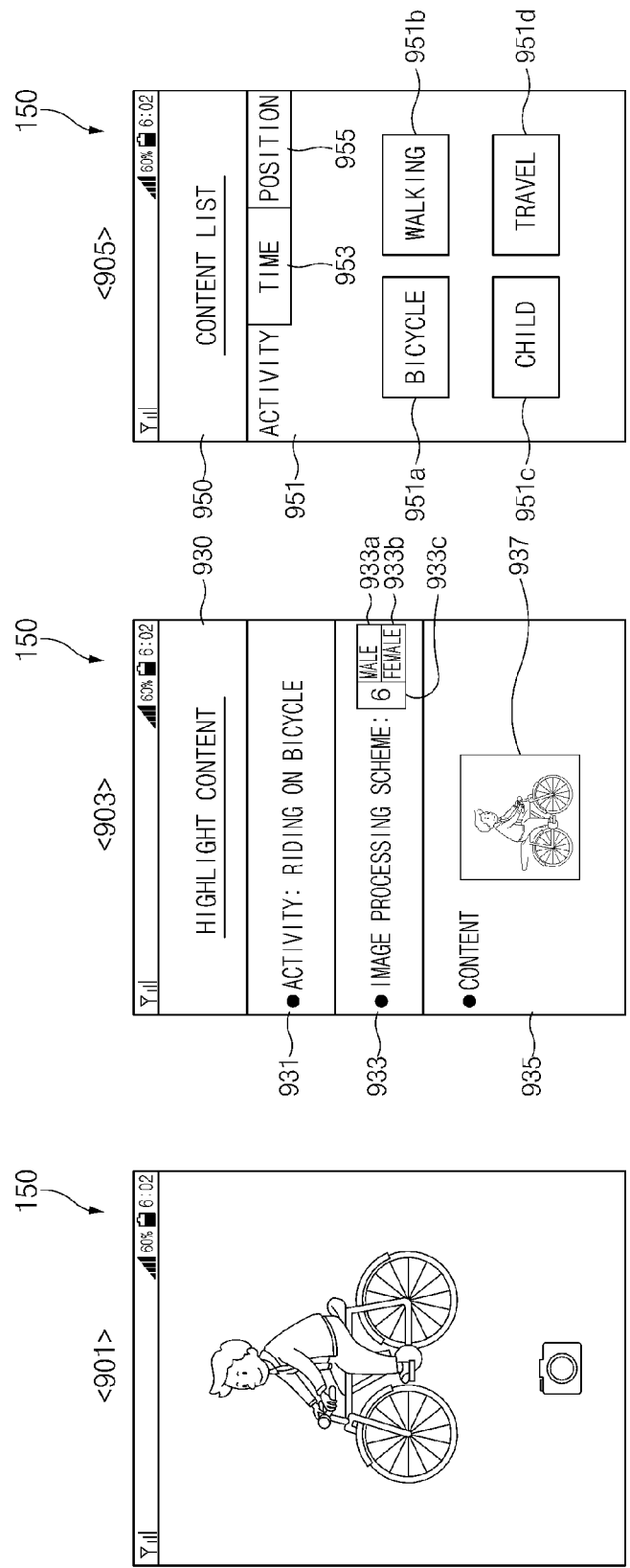
FIG. 9 is a drawing illustrating a screen interface associated with image processing according to various embodiments of the present disclosure.

FIG. 9 is a drawing illustrating a screen interface associated with image processing according to various embodiments of the present disclosure.

Referring to FIG. 9, according to various embodiments of the present disclosure, the electronic device 100 of FIG. 1 may activate the camera 190 and may obtain an image for a specific object. In this operation, in state 901, a display 150 of the electronic device 100 may output an image acquisition screen. The screen displayed in state 901 may display, for example, at least one of a still image or a video of an object. According to various embodiments of the present disclosure, an image output on the display 150 may be an image captured and transmitted by an external electronic device 102 of FIG. 1. The electronic device 100 may activate at least one sensor in connection with generating highlight content. Alternatively, the electronic device 100 may collect context information.

According to various embodiments of the present disclosure, if the acquisition of the image is completed (e.g., if the camera 190 is inactive) or if a highlight content generation function is requested, the electronic device 100 may generate highlight content using the obtained images. Alternatively, if the camera 190 is activated by the highlight content generation function, the electronic device 100 may obtain images during a predetermined time. Alternatively, after capturing of an image is started, if an end input event occurs, the electronic device 100 may generate highlight content.

According to various embodiments of the present disclosure, the electronic device 100 may analyze an activity type in connection with generating highlight content and may select an image processing scheme according to the analyzed activity type. Therefore, the electronic device 100 may display information shown in FIG. 9 on the display 150. For example, in state 903, the display 150 may output a highlight content information screen 930. The highlight content information screen 930 may include, for example, an activity information region 931, an image processing scheme region 933, and a highlight content display region 935 for displaying highlight content generated by a selected image processing scheme 933c.

The activity information region 931 may display, for example, information about an activity type (e.g., a bicycle movement activity) analyzed according to at least one of image analysis information, sensor information, or context information. According to various embodiments of the present disclosure, the activity information region 931 may output a list including another activity type (e.g., items such as a walking item, a running item, and a vehicle item) in response to a control of a user input. If an activity type is changed in response to a user input, contents of the selected image processing scheme region 933 may be automatically changed in response to the changed activity type.

The image processing scheme region 933 may display predetermined information in response to an activity type. The image processing scheme region 933 may be classified and displayed with a number or a character. For example, the image processing scheme region 933 may display the selected image processing scheme 933c corresponding to an activity type. The selected image processing scheme 933c may be changed to another number or character in response to a control of a user input. A filter applying scheme in response to the other number or character or a filter having a different parameter value are set by the other number or character.

According to various embodiments of the present disclosure, the image processing scheme region 933 may include a male item 933a or a female item 933b. The male item 933a or the female item 933b may be an item of processing types of filtered images relative to set specific values. For example, the male item 933a or the female item 933b may be a weight value item for classifying an image as a highlight image, including an object corresponding to a predetermined category among objects included in a plurality of obtained images. According to an embodiment of the present disclosure, if the male item 933a is selected, an image operation module 180 may detect images (e.g., images in which the entire form of a person object is verified), in which the ratio of a person object to a background object is a constant ratio or more, among a plurality of obtained images as a highlight image. According to an embodiment of the present disclosure, if the female item 933b is selected, the image operation module 180 may detect images, in which a ratio of surrounding objects (e.g., clothes, accessories, bags, and the like) disposed in connection with a person object is a constant ratio or more, among a plurality of obtained images as a highlight image.

The highlight content display region 935 may be a region that displays at least a partial image of a highlight content 937 generated by the selected image processing scheme 933c. The highlight content 937 may be changed in various ways in response to, for example, a change of an activity, a change of an image processing scheme, and selection of the male item 933a or the female item 933b. The electronic device 100 may generate and store content of one obtained group, for example, highlight content to which the male item 933a is applied and highlight content to which the female item 933b is applied.

According to various embodiments of the present disclosure, in state 905, the display 150 of the electronic device 100 may output a content list screen 950 for searching for highlight content. The content list screen 950 may include, for example, an activity classification list 951, a time classification list 953, and a position classification list 955. The activity classification list 951 may include, for example, a variety of highlight content classified according to an activity, for example, highlight content 951a based on bicycle activity, highlight content 951b based on walking activity, highlight content 951c based on child activity, and highlight content 951d based on travel activity. The time classification list 953 may include, for example, highlight content classified on an hourly basis, a daily basis, a monthly basis, a yearly basis, and the like. The position classification list 955 may include, for example, highlight content classified by a predetermined position unit (e.g., a company, a home, and the like).

According to various embodiments of the present disclosure, the electronic device may generate highlight content suitable for an activity of a user using images and videos captured through a wearable camera such that he or she is able to find images easily and share the highlight content with other people.

According to various embodiments of the present disclosure, the electronic device 100 may automatically make highlight images and then make an image album of images and/or videos captured while the user travels wearing a wearable camera. According to various embodiments of the present disclosure, after the user wears the wearable camera and goes jogging in the morning, the electronic device 100 may extract photos every 500 meters and may provide highlight content. Also, the electronic device 100 may provide photos of particularly scenic views as highlight content. According to various embodiments of the present disclosure, if the user wears the wearable camera and rides on a bicycle, the electronic device 100 may provide, for example, a time lapse video/images of the entire path. According to various embodiments of the present disclosure, if the user wears a wearable camera and attends a family gathering, and if groups of people who attend the family gathering are determined as parts of different families through, for example, the user's input, the electronic device 100 may generate a family video for each family, as well as the entire highlight video, and may share the corresponding videos with the families.

In case of a walking activity according to various embodiments of the present disclosure, a user who possesses the electronic device 100 may walk at a speed and direction that are associated with walking. If the user collecting videos of the walk, the electronic device 100 may analyze the collected input data as having an up-and-down motion. According to an embodiment of the present disclosure, a sensor (e.g., an acceleration sensor) included in the electronic device 100 may collect sensor information associated with motion that has a speed of about 4 to 5 kilometers per hour. The electronic device 100 may verify exercise records or a predetermined schedule according to a user input (e.g., a user context) to verify that a current time is a time corresponding to context information input as "walking." The electronic device 100 may determine that the user is in a currently walking state.

The electronic device 100 may apply different weight values to image information, sensor information, and user input information, or may apply weight values to threshold information, and may finally evaluate a current state as a walking activity state. There may be various ways for the electronic device 100 to apply weight values to information. For example, the electronic device 100 may specify a weight value in various ways according to a type of user input information. According to an embodiment of the present disclosure, if the user input information is predetermined information (e.g., information about walking), the electronic device 100 may assign an image information weight value score for activity evaluation to be relatively higher than sensor information.

Therefore, if a change of image information meets a predetermined condition (e.g., detecting up-and-down motion in images corresponding to walking) in activity evaluation, the electronic device 100 may determine the current state as the walking activity state and may correct the present activity to walking activity. For example, although the current state may be displayed as a running activity state because obtained sensor information is greater than or equal to a predetermined condition, if image information is determined as walking context information, the electronic device 100 may determine the current state as the walking activity state. Alternatively, if the weight for sensor information is greater than the weight for image information, although analysis of the images may have determined the present activity as walking activity, the electronic device 100 may determine the current state as a running activity state.

If the current state is determined as the walking activity state in activity evaluation, the electronic device 100 may determine flow control in the order of filtering (e.g., rough motion compensation) of an image stabilizer for collected images, a quality filter (QF), a duplicate filter (DF), a face filter (for filtering for a face using identified facial features for a person), and an object/scene classification filter (CF). If the flow control is determined, the electronic device 100 may process collected images in response to the corresponding flow control. As described above, the flow control of the electronic device 100 may be a way using predetermined filters according to a result of activity evaluation. Alternatively, the electronic device 100 may correct characteristics of predetermined filters according to a result of activity evaluation and a state of image information or sensor information. For example, the electronic device 100 may determine the flow control according to the determination of the walking activity state and may roughly apply a characteristic of a filter or strictly apply a characteristic of a filter according to an upper and lower motion value of image information or sensor information value. In this regard, the electronic device 100 may include at least one upper and lower movement condition of image information or at least one magnitude condition of sensor information, and the like. The electronic device 100 may verify that obtained information associated with current image information or obtained sensor information is any reference value relative to at least one upper and lower movement condition of the image information or the at least one magnitude condition of the sensor information. The electronic device 100 may change or maintain a filter characteristic value of the flow control according to the verified reference value.

In connection with a walking activity, detected upper and lower motion in images is relatively strong for walking compared to standing. Also, since detected upper and lower motion in images is relatively weak for walking compared to running, the electronic device 100 may roughly apply a movement compensation level. Accordingly, in an embodiment of the invention, the electronic device 100 may apply a QF to filter images having a quality of a predetermined value or less. A predetermined value associated with the quality may be changed according to a result of evaluating an activity or according to an average level of upper and lower motion or an average level during a predetermined time.

The electronic device 100 may use a DF for images that are deemed to be duplicates by a predetermined value or more. In case of walking, since the user may look around during walking (or since he or she walks at a movement speed of a predetermined level or less), the electronic device 100 may filter an image through face recognition. Herein, the electronic device 100 may control filtering of an image including face feature points of a predetermined size or more according to a type of an evaluated activity (e.g., a walking activity). Herein, the predetermined size may be smaller than that of another activity (e.g., a running activity and the like).

If a background includes meaningful information, the electronic device 100 may filter the meaningful information through object or scene recognition. In this regard, the electronic device 100 may have stored a variety of condition information for verifying whether an obtained image includes meaningful information or may provide corresponding image information to a server device for analyzing semantic information.

The electronic device 100 may group images filtered according to flow control. In this operation, the electronic device 100 may define a grouping characteristic relative to an evaluated activity (e.g., a walking activity). For example, the electronic device 100 may apply time or place based grouping, may determine an absolute time interval between generated groups as a predetermined first time (e.g., three hours), and may determine an absolute distance interval (or an absolute location interval) as a predetermined first distance (e.g., ten kilometers). According to various embodiments of the present disclosure, the electronic device 100 may store reference information (e.g., the first time or the first distance, and the like) about at least one of a time or a place. The electronic device 100 may perform grouping relative to the reference information. The reference information may be calculated according to data statistically or experimentally in response to a related activity or may be preset by a designer or a user. Alternatively, if data of a constant reference value or more are collected in connection with operating an activity of the user, the reference information may be determined according to a pattern analysis of the corresponding data.

According to various embodiments of the present disclosure, a grouping operation may be processed by receiving a start/stop event in a related application. The related application may be, for example, a calendar application, an S-health application, and the like. Also, the electronic device 100 may interwork with a predetermined exercise application (e.g., a pedometer) and may assume one group from a start time to an end time in the grouping operation.

The electronic device 100 may generate a highlight using an evaluated activity and grouped groups. For example, the electronic device 100 may generate a time lapse video and may generate an image set at predetermined time intervals (e.g., five minutes). In connection with a time lapse scheme, the time lapse scheme may be basically or automatically provided to show context information corresponding to an overall exercise in a way of maximizing appreciation of an activity during a predetermined time. Various schemes, such as a person-oriented scheme or a landscape-oriented scheme, other than the above-mentioned time lapse scheme may be provided according to a control of a user input or an intention of the designer.

In connection with a running activity according to various embodiments of the present disclosure, upper and lower motion of an image obtained in a running context by the electronic device 100 may periodically occur at a predetermined level or more. Also, a sensor (e.g., an acceleration sensor) may obtain sensor information that is mainly moving back and forth at a speed of about 10 to 15 kilometers per hour and may obtain sensor information of up-and-down movements and left-and-right movements. In connection with user input information (e.g., user context information), the user may input "jogging" in a current time item among exercise record and schedule items and may input or preset a running item in an external electronic device (e.g., a wearable electronic device) that interworks with the electronic device 100. The electronic device 100 may determine that the user is in a running context using an API. Therefore, the electronic device 100 may determine the current context as a running activity in connection with activity evaluation.

In connection with a flow control, the electronic device 100 may apply filtering (e.g., sharp or strict motion compensation) of an image stabilizer, a QF, and a DF in that order to an obtained image. The flow control may be a result according to evaluation of a running activity. The electronic device 100 may apply characteristics of the QF and the DF in a different way according to a running context. For example, if a running speed is a predetermined speed or more, the electronic device 100 may decrease a quality value of the QF to a predetermined value or less (or a predetermined value or more) and may increase a duplicate region value of the DF to a predetermined value or more (or a predetermined value or less). In case of running, since motion is relatively strong and it is difficult for the user to see an obtained image, the electronic device 100 may adjust the obtained image such that the user comfortably sees the adjusted image and motion is not strong by sharply or strictly applying motion compensation to the obtained image. The QF may be used to filter a very bad image (or a predetermined size or less or a predetermined resolution or less, and the like). The DF may be used to filter images that are excessively duplicated. In case of running, since the user runs at a faster speed than when walking, there may be a high probability that he or she will look to the front rather than looking to the side. In this case, an image of the front in which the user runs may be important rather than a specific person or object. Therefore, the electronic device 100 may reinforce filtering or correction of image information emphasizing the front in a filtering process.

In connection with grouping, the electronic device 100 may apply time or place based grouping according to evaluation of a running activity, may designate an absolute time interval between groups as, for example, three hours, and may have an absolute distance interval as, for example, ten kilometers. Herein, the electronic device 100 may store reference information (e.g., the three hours or the ten kilometers) about the absolute time interval or the absolute distance interval. The reference information may be generated through data obtained statistically or experimentally. Alternatively, the reference information may be preset by the designer or the user associated with activity evaluation. Alternatively, if data associated with a specific activity (e.g., a running activity) are collected by a constant reference value or more, the reference information may be calculated through a pattern analysis of the collected data.

According to an embodiment of the present disclosure, in case of running, since there is a high probability that the user will exceed 10 kilometers per hour experimentally or statistically, the electronic device 100 may assume one group as 10 kilometers per hour according to an intention of the designer. Also, the electronic device 100 may group and show images during a specific time (e.g., three hours) into one group. If a specific time or a specific distance is exceeded, the electronic device 100 may determine occurrence of a relatively long time and a relatively great position change and may group the images during the specific time into different groups. Also, in connection with grouping, the electronic device 100 may receive a start event and an end event of a specific application and may group images between the start event and the end event.

In connection with a highlight, the electronic device 100 may extract an image set from a video according to evaluation of a running activity and may configure a highlight image using the extracted image set. In case of running, since motion (e.g., movement of an object of the highlight image) in every frame is relatively large or fast, it may be uncomfortable for the user to view the video because motion of the video is large. Therefore, in case of running activity, the electronic device 100 may generate a highlight by suitably combining photos of a captured video or may provide the captured video using an image slide function.

In connection with a normal activity according to various embodiments of the present disclosure, when the user who possesses the electronic device 100 performs a normal action, for example, when he or she plays with a child, the electronic device 100 may continuously observe the same person from images obtained by the electronic device 100. A sensor (e.g., a global positioning system (GPS) sensor) may obtain sensor information in which a location has not changed greatly. Also, a sensor (e.g., an acceleration sensor or a gyroscope sensor) may obtain information in which irregular motion occurs continuously. Also, in connection with a user input (e.g., a user context), the electronic device 100 may verify a state in which there is no input information.

The electronic device 100 may determine a current state as a normal activity state according to at least one of image information, sensor information, and user input information and predetermined reference information. The reference information may include at least one of previously obtained image information, previously obtained sensor information, and previously obtained user input information, which are configured to determine the current state as the normal activity state. For example, the reference information may include information if information about the same person is repeatedly output during a constant time or in the constant number of frames through face recognition.

In connection with flow control, the electronic device 100 may apply a predetermined flow control, including a QF, a DF, a face filter, and an object and scene CF, in response to an evaluated normal activity result. Images obtained in a normal activity context may have a relatively low probability of showing a specific pattern either statistically or experimentally. Therefore, the electronic device 100 may filter images, which have a quality of a predetermined level or less and are continuously duplicated by a specific value or more, through the QF and the DF. Therefore, if there is no motion (or if there is motion of a predetermined size or less), a captured image may be filtered by the DF. The electronic device 100 may store reference information for determining an activity with a specific person as an important factor in a normal activity context. The reference information may be preset or changed by the user or the designer. Alternatively, the reference information may be obtained or changed through data obtained statistically or experimentally. If an activity factor with a specific person is selected as reference information, the electronic device 100 may find an image via face recognition and may additionally detect an image, including an object having certain meaning, through object and scene recognition. The object having certain meaning may be having a specific object.

In connection with grouping, the electronic device 100 may apply time or distance based grouping, may designate an absolute time interval between groups as three hours, and may designate an absolute distance interval as five kilometers. In case of something other than exercise, statistically or experimentally, or according to constant reference information stored in the electronic device 100, the electronic device 100 may assume a predetermined distance (e.g., about five kilometers) as a motion radius and may assume a predetermined time (e.g., about three hours) as one meaningful activity grouping unit. The above-mentioned time and distance may be changed according to a control of a user input or a design change of the designer. Alternatively, the predetermined distance or time may be stored in the electronic device 100 as reference information. The reference information may be calculated from statistical or experimental data or from pattern data obtained from data of a constant reference value or more obtained according to operation of the electronic device 100.

In connection with generating a highlight, the electronic device 100 may generate a video per group, including an image slide effect, in response to an evaluated normal activity result. The electronic device 100 may connect frame groups on meaningful frames found through filtering to generate one video.

As described above, according to various embodiments of the present disclosure, the electronic device may improve the quality of highlight content by recognizing an activity according to context and performing flow control for generating a highlight according to the recognized activity. The electronic device may reduce heating of the electronic device and improve availability of a battery of the electronic device by reducing unnecessary calculation. As described above, according to various embodiments of the present disclosure, the image processing method may include receiving a plurality of images, analyzing a context of a user, extracting at least one or more image from the plurality of images according to the analyzed context of the user, and generating at least one image using the extracted image.

According to various embodiments of the present disclosure, the plurality of images may be automatically captured according to predetermined settings.

According to various embodiments of the present disclosure, the analyzing of the context of the user may include analyzing a pattern of the plurality of received images and determining the context of the user according to the pattern.

According to various embodiments of the present disclosure, the image processing method may further include receiving sensor data from at least one or more sensors. The analyzing of the context of the user may include analyzing the context of the user according to the sensor data.

According to various embodiments of the present disclosure, the image processing method may further include extracting at least one or more application data. The analyzing of the context of the user may include analyzing the context of the user according to the application data.

Figure 10:
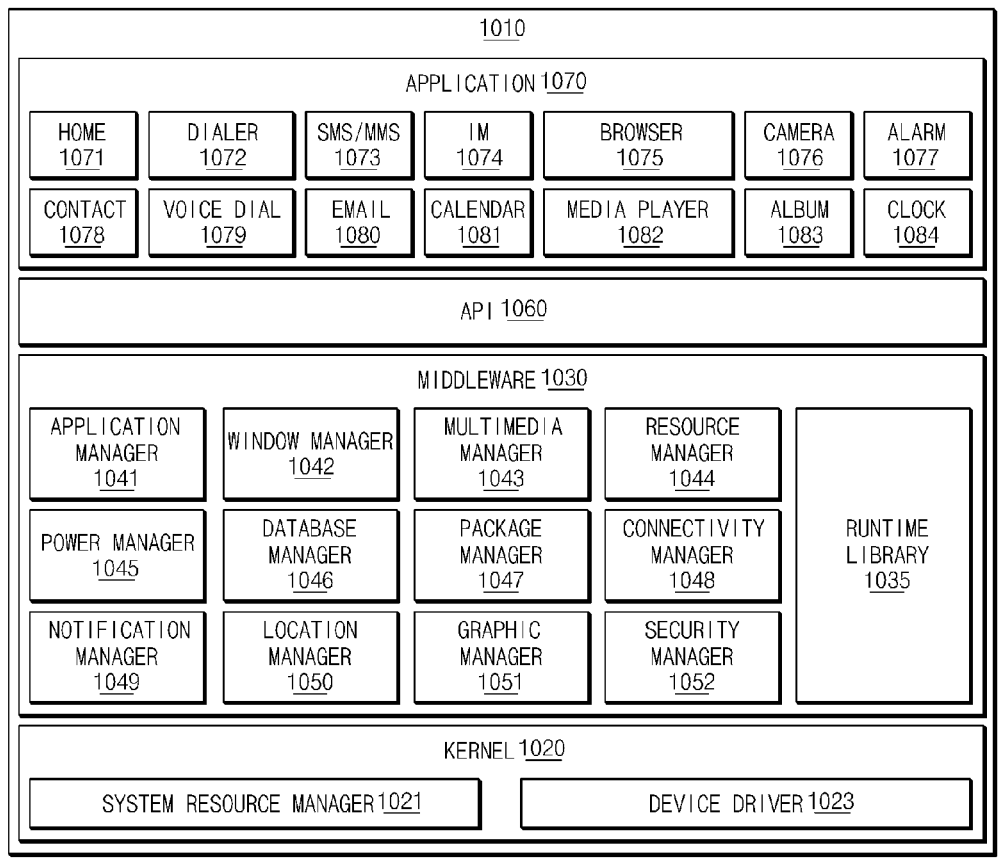
FIG. 10 is a block diagram illustrating a configuration of a program module according to various embodiments of the present disclosure.

FIG. 10 is a block diagram illustrating a configuration of a program module 1010 according to various embodiments of the present disclosure.

Referring to FIG. 10, according to an embodiment of the present disclosure, the program module 1010 (e.g., program 140 of FIG. 1) may include an operating system (OS) for controlling resources associated with an electronic device (e.g., electronic device 100 of FIG. 1) and/or various applications (e.g., application program 147 of FIG. 1) that are executed on the OS. The OS may be, for example, Android, iOS, Windows, Symbian, Tizen, or Bada, and the like.

The program module 1010 may include a kernel 1020, a middleware 1030, an application programming interface (API) 1060, and/or an application 1070. At least a part of the program module 1010 may be preloaded on the electronic device, or may be downloaded from an external electronic device (e.g., external electronic devices 102 and 200 and a server device 106 of FIG. 1).

The kernel 1020 (e.g., a kernel 141 of FIG. 1) may include, for example, a system resource manager 1021 and/or a device driver 1023. The system resource manager 1021 may manage access to and use of system resources. According to an embodiment of the present disclosure, the system resource manager 1021 may include a process management unit, a memory management unit, a file system management unit, and the like. The device driver 1023 may include, for example, a display driver, a camera driver, a Bluetooth (BT) driver, a shared memory driver, a universal serial bus (USB) driver, a keypad driver, a wireless-fidelity (Wi-Fi) driver, an audio driver, or an inter-process communication (IPC) driver.

The middleware 1030 may provide, for example, functions the application 1070 needs, and may provide various functions to the application 1070 through the API 1060 such that the application 1070 efficiently uses limited system resources in the electronic device. According to an embodiment of the present disclosure, the middleware 1030 (e.g., a middleware 143 of FIG. 1) may include at least one of a runtime library 1035, an application manager 1041, a window manager 1042, a multimedia manager 1043, a resource manager 1044, a power manager 1045, a database manager 1046, a package manager 1047, a connectivity manager 1048, a notification manager 1049, a location manager 1050, a graphic manager 1051, or a security manager 1052.

The runtime library 1035 may include, for example, a library module used by a compiler to add a new function through a programming language while the application 1070 is executed. The runtime library 1035 may perform a function about input and output management, memory management, or an arithmetic function.

The application manager 1041 may manage, for example, a life cycle of at least one of the application 1070. The window manager 1042 may manage graphic user interface (GUI) resources used on a screen of the electronic device. The multimedia manager 1043 may ascertain a format necessary for reproducing various media files and may encode or decode a media file using a codec corresponding to the corresponding format. The resource manager 1044 may manage source codes of at least one of the application 1070, and may manage resources of a memory or a storage space, and the like.

The power manager 1045 may act together with, for example, a basic input/output system (BIOS) and the like, may manage a battery or a power source, and may provide power information necessary for an operation of the electronic device. The database manager 1046 may generate, search, or change a database to be used in at least one of the application 1070. The package manager 1047 may manage installation or update of an application distributed by a type of a package file.

The connectivity manager 1048 may manage, for example, wireless connection such as Wi-Fi connection or BT connection, and the like. The notification manager 1049 may display or notify events, such as an arrival message, an appointment, and proximity notification, by a method which is not disturbed to the user. The location manager 1050 may manage location information of the electronic device. The graphic manager 1051 may manage a graphic effect to be provided to the user or a user interface (UI) related to the graphic effect. The security manager 1052 may provide all security functions necessary for system security or user authentication, and the like. According to an embodiment of the present disclosure, when the electronic device (e.g., the electronic device 100) has a phone function, the middleware 1030 may further include a telephony manager (not shown) for managing a voice or video communication function of the electronic device.

The middleware 1030 may include a middleware module which configures combinations of various functions of the above-described components. The middleware 1030 may provide a module specific to an OS to provide a differentiated function. Also, the middleware 1030 may dynamically delete some of old components or may add new components.

The API 1060 (e.g., API 145 of FIG. 1) may be, for example, a set of API programming functions, and may be provided with different components according to OSs. For example, in case of Android or iOS, one API set may be provided according to platforms. In case of Tizen, two or more API sets may be provided according to platforms.

The application 1070 (e.g., an application program 147 of FIG. 1) may include one or more of, for example, a home application 1071, a dialer application 1072, a short message service/multimedia message service (SMS/MMS) application 1073, an instant message (IM) application 1074, a browser application 1075, a camera application 1076, an alarm application 1077, a contact application 1078, a voice dial application 1079, an e-mail application 1080, a calendar application 1081, a media player application 1082, an album application 1083, a clock application 1084, as well as other applications not shown, such as a health care application (e.g., an application for measuring quantity of exercise or blood sugar, and the like), or an environment information application (e.g., an application for providing atmospheric pressure information, humidity information, or temperature information, and the like), and the like.

According to an embodiment of the present disclosure, the application 1070 may include an application (hereinafter, for better understanding and ease of description, referred to as "information exchange application") for exchanging information between the electronic device (e.g., the electronic device 100) and an external electronic device (e.g., the external electronic devices 102 and 200). The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device (e.g., the external electronic devices 102 and 200). Also, the notification relay application may receive, for example, notification information from the external electronic device, and may provide the received notification information to the user of the electronic device.

The device management application may manage (e.g., install, delete, or update), for example, at least one function (e.g., turning on/off the external electronic device itself (or partial components) or a adjusting brightness (or resolution) of a display) of the external electronic device (e.g., the external electronic devices 102 and 200) that communicates with the electronic device, or an application that operates in the external electronic device, or a service (e.g., a call service or a message service) provided from the external electronic device.

According to an embodiment of the present disclosure, the application 1070 may include an application (e.g., the health care application of a mobile medical device) that is preset according to attributes of the electronic device. According to an embodiment of the present disclosure, the application 1070 may include an application received from the external electronic device (e.g., the server device 106 or the external electronic devices 102 and 200). According to an embodiment of the present disclosure, the application 1070 may include a preloaded application or a third party application that may be downloaded from a server. Names of the components of the program module 1010 according to various embodiments of the present disclosure may differ according to kinds of OSs.

According to various embodiments of the present disclosure, at least a part of the program module 1010 may be implemented with software, firmware, hardware, or any combination thereof. At least a part of the program module 1010 may be implemented (e.g., executed) by, for example, a processor (e.g., a processor 120 of FIG. 1). At least a part of the program module 1010 may include, for example, a module, a program, a routine, sets of instructions, or a process, and the like for performing one or more functions.

Figure 11:
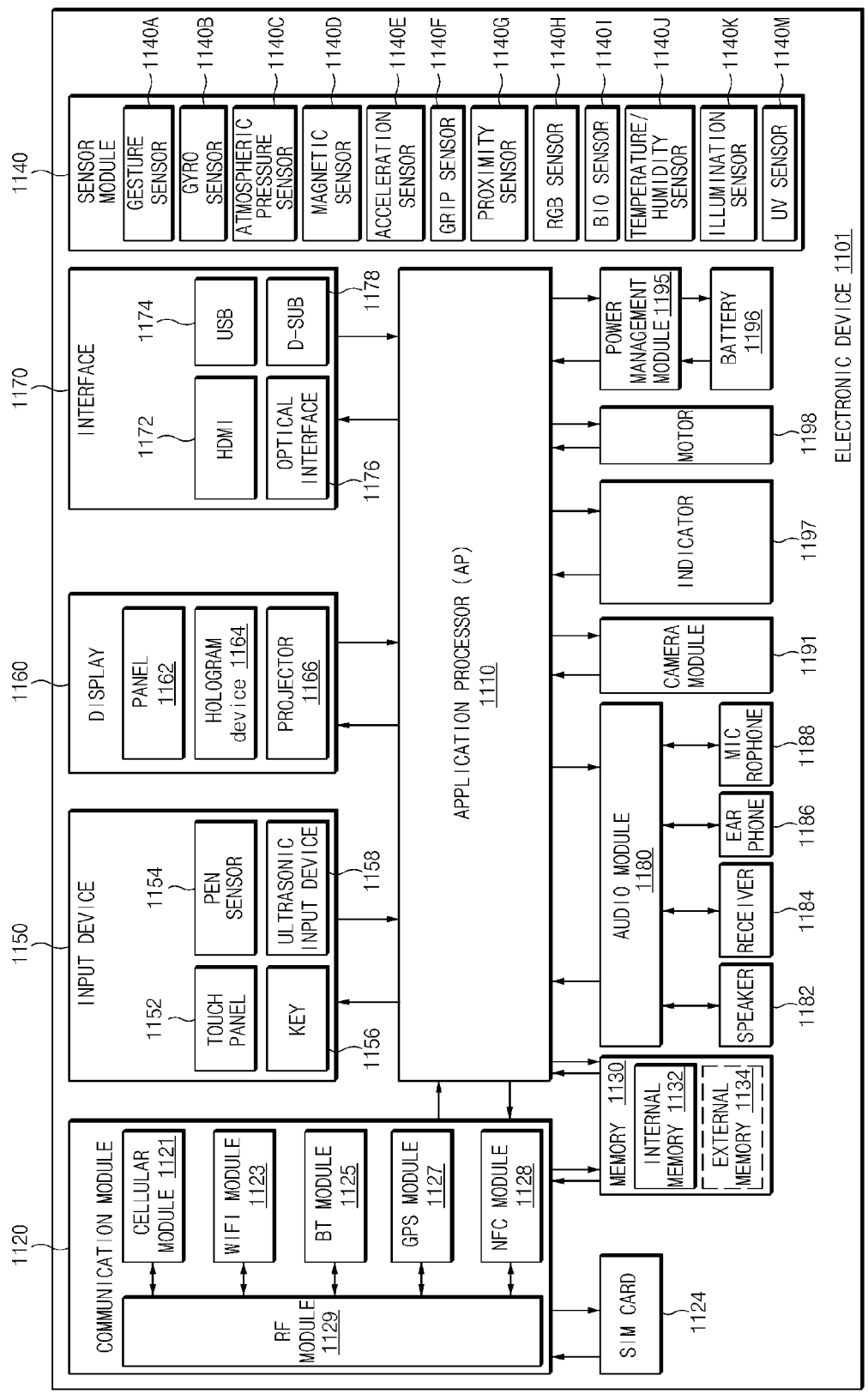
FIG. 11 is a block diagram illustrating a configuration of an electronic device according to various embodiments of the present disclosure.

FIG. 11 is a block diagram illustrating a configuration of an electronic device 1101 according to various embodiments of the present disclosure.

Referring to FIG. 11, an electronic device 1101 may include, for example, all or a part of the electronic device 100 shown in FIG. 1. The electronic device 1101 may include one or more processors (e.g., application processors (APs)) 1110, a communication module 1120, a subscriber identification module (SIM) 1124, memory 1130, a sensor module 1140, an input device 1150, a display 1160, an interface 1170, an audio module 1180, a camera module 1191, a power management module 1195, a battery 1196, an indicator 1197, and a motor 1198.

The processor 1110 may execute, for example, an operating system (OS) or an application program to control a plurality of hardware or software components and may process and compute a variety of data. The processor 1110 may be implemented with, for example, a system on chip (SoC). According to an embodiment of the present disclosure, the processor 1110 may further include a graphic processing unit (GPU) (not shown) and/or an image signal processor (not shown). The processor 1110 may include at least some (e.g., a cellular module 1121) of the components shown in FIG. 11. The processor 1110 may load instructions or data received from at least one of the other components to a volatile memory (e.g., in memory 1130) to process the data and may store various data in a non-volatile memory (e.g., in memory 1130).

The communication module 1120 may have the same or similar configuration as the communication interface 160 of FIG. 1. The communication module 1120 may include, for example, a cellular module 1121, a wireless-fidelity (Wi-Fi) module 1123, a Bluetooth (BT) module 1125, a global positioning system (GPS) module 1127, a near field communication (NFC) module 1128, and a radio frequency (RF) module 1129.

The cellular module 1121 may provide, for example, voice call service, video call service, text message service, Internet service, and the like through a communication network. According to an embodiment of the present disclosure, the cellular module 1121 may identify and authenticate the electronic device 1101 in a communication network using a SIM (e.g., the SIM 1124). According to an embodiment of the present disclosure, the cellular module 1121 may perform at least a part of the functions that may be provided by the processor 1110. According to an embodiment of the present disclosure, the cellular module 1121 may include a communication processor (CP).

The Wi-Fi module 1123, the BT module 1125, the GPS module 1127, and/or the NFC module 1128 may include, for example, a processor for processing data transmitted and received through the corresponding module. According to various embodiments of the present disclosure, at least a part (e.g., two or more) of the cellular module 1121, the Wi-Fi module 1123, the BT module 1125, the GPS module 1127, and/or the NFC module 1128 may be included in one integrated chip (IC) or one IC package.

The RF module 1129 may transmit and receive, for example, a communication signal (e.g., an RF signal). Though not shown, the RF module 1129 may include, for example, a transceiver, a power amplifier module (PAM), a frequency filter, or a low noise amplifier (LNA), an antenna, and the like. According to another embodiment of the present disclosure, at least one of the cellular module 1121, the Wi-Fi module 1123, the BT module 1125, the GPS module 1127, or the NFC module 1128 may transmit and receive an RF signal through a separate RF module.

The SIM 1124 may include, for example, a card that includes a SIM and/or an embedded SIM. The SIM 1124 may include unique identification information (e.g., an integrated circuit card identifier (ICCID)) or subscriber information (e.g., an international mobile subscriber identity (IMSI)).

The memory 1130 (e.g., a memory 130 of FIG. 1) may include, for example, an embedded memory 1132 or an external memory 1134. The embedded memory 1132 may include at least one of, for example, volatile memory (e.g., a dynamic random access memory (DRAM), static RAM (SRAM), synchronous dynamic RAM (SDRAM), and the like), or non-volatile memory (e.g., one-time programmable read only memory (OTPROM), programmable ROM (PROM), erasable and programmable ROM (EPROM), electrically erasable and programmable ROM (EEPROM), mask ROM, flash ROM, flash memory (e.g., NAND flash memory or NOR flash memory, and the like), a hard drive, or a solid state drive (SSD)).

The external memory 1134 may further include a flash drive such as, for example, compact flash (CF), secure digital (SD), micro-SD, mini-SD, extreme digital (xD), memory stick, and the like. The external memory 1134 may functionally and/or physically connect with the electronic device 1101 through various interfaces.

The sensor module 1140 may measure, for example, a physical quantity or may detect an operation state of the electronic device 1101, and may convert the measured or detected information to an electric signal. The sensor module 1140 may include at least one of, for example, a gesture sensor 1140A, a gyroscope sensor 1140B, an atmospheric pressure sensor 1140C, a magnetic sensor 1140D, an acceleration sensor 1140E, a grip sensor 1140F, a proximity sensor 1140G, a color sensor 1140H (e.g., red, green, blue (RGB) sensor), a biometric sensor 1140I, a temperature/humidity sensor 1140J, an illumination sensor 1140K, or a ultraviolet (UV) sensor 1140M. Additionally or alternatively, the sensor module 1140 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 1140 may further include a control circuit for controlling at least one or more sensors included therein. According to various embodiments of the present disclosure, the electronic device 1101 may further include a processor configured to control the sensor module 1140, as a part of the processor 1110 or to be independent of the processor 1110. While the processor 1110 is in a sleep state, the electronic device 1101 may control the sensor module 1140.

The input device 1150 may include, for example, a touch panel 1152, a (digital) pen sensor 1154, a key 1156, or an ultrasonic input unit 1158. The touch panel 1152 may recognize a touch input using at least one of, for example, a capacitive detecting method, a resistive detecting method, an infrared detecting method, or an ultrasonic detecting method. Also, the touch panel 1152 may further include a control circuit. The touch panel 1152 may further include a tactile layer and may provide a tactile reaction to a user.

The (digital) pen sensor 1154 may be, for example a part of a touch panel or may include a separate sheet for recognition. The key 1156 may include, for example, a physical button, an optical key, or a keypad. The ultrasonic input unit 1158 may allow the electronic device 1101 to detect a sound wave using a microphone (e.g., a microphone 1188) and to verify data through an input tool generating an ultrasonic signal.

The display 1160 (e.g., a display 150 of FIG. 1) may include a panel 1162, a hologram device 1164, or a projector 1166. The panel 1162 may include the same or similar configuration as that of the display 150. The panel 1162 may be implemented to be, for example, flexible, transparent, and/or wearable. The panel 1162 and the touch panel 1152 may be integrated into one module. The hologram device 1164 may show a stereoscopic image using interference of light. The projector 1166 may project light onto a screen to display an image. The screen may be positioned, for example, inside or outside the electronic device 1101. According to an embodiment of the present disclosure, the display 1160 may further include a control circuit for controlling the panel 1162, the hologram device 1164, or the projector 1166.

The interface 1170 may include, for example, a high-definition multimedia interface (HDMI) 1172, a universal serial bus (USB) 1174, an optical interface 1176, or a D-subminiature 1178. The interface 1170 may be included in, for example, a communication interface 160 shown in FIG. 1. Additionally or alternatively, the interface 1170 may include, for example, a mobile high definition link (MHL) interface, an SD card/multimedia card (MMC) interface, or an infrared data association (IrDA) standard interface.

The audio module 1180 may convert sound to electric signals, and vice versa. At least a part of the audio module 1180 may be included in, for example, an input and output interface 170 shown in FIG. 1. The audio module 1180 may process sound information input or output through, for example, a speaker 1182, a receiver 1184, an earphone 1186, the microphone 1188, and the like. The microphone 1188 included in the audio module 1180 may collect audio data which may be used as input information and remote authentication information or local authentication information.

The camera module 1191 may be a device able to capture a still image and a moving image (video). According to an embodiment of the present disclosure, the camera module 1191 may include one or more image sensors (not shown) (e.g., a front sensor or a rear sensor), a lens (not shown), an image signal processor (ISP) (not shown), or a flash (not shown) (e.g., an LED or a xenon lamp).

The power management module 1195 may manage, for example, power of the electronic device 1101. According to an embodiment of the present disclosure, though not shown, the power management module 1195 may include a power management integrated circuit (PMIC), a charger IC or a battery (fuel) gauge. The PMIC may have a wired charging method and/or a wireless charging method. The wireless charging method may include, for example, a magnetic resonance method, a magnetic induction method, an electromagnetic method, and the like. An additional circuit for wireless charging, for example, a coil loop, a resonance circuit, or a rectifier, and the like may be further provided. The battery gauge may measure, for example, the remaining capacity of the battery 1196 and voltage, current, or temperature thereof while the battery 1196 is charged. The battery 1196 may be, for example, a rechargeable battery and/or a solar battery.

The indicator 1197 may display a specific state of the electronic device 1101 or a part (e.g., the processor 1110) thereof, for example, a booting state, a message state, or a charging state, and the like. The motor 1198 may convert an electric signal into mechanical vibration and may generate vibrations, a haptic effect, and the like. Though not shown, the electronic device 1101 may include a processing unit (e.g., a GPU) for supporting mobile TV. The processing unit for supporting mobile TV may process media data according to standards such as, for example, digital multimedia broadcasting (DMB) standard, digital video broadcasting (DVB) standard, media flow standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

The terminology "module" used herein may mean, for example, a unit including one of hardware, software, and firmware, or combinations thereof. The terminology "module" may be interchangeably used with, for example, terminologies "unit," "logic," "logical block," "component," "circuit," and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

According to various embodiments of the present disclosure, at least a part of a device (e.g., modules or the functions) or a method (e.g., operations) may be implemented with, for example, instructions stored in a computer-readable storage media that has a program module. When the instructions are executed by a processor (e.g., a processor 120 of FIG. 1), one or more processors may perform functions corresponding to the instructions. The computer-readable storage media may be, for example, a memory 130 of FIG. 1.

The computer-readable storage media may include a hard disc, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a ROM, a random access memory (RAM), or a flash memory, etc.), and the like. Also, the program instructions may include not only mechanical codes compiled by a compiler but also high-level language codes which may be executed by a computer using an interpreter and the like. The above-mentioned hardware device may be configured to operate as one or more software modules to perform operations according to various embodiments of the present disclosure, and vice versa.

Modules or program modules according to various embodiments of the present disclosure may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added.

According to various embodiments of the present disclosure, the computer-readable storage media may store instructions that may be executed by at least one processor. The instructions may be set to collect images, to determine an activity type of an electronic device at a time when the images are obtained, to select an image processing scheme having a filtering condition corresponding to the activity type, to select or process some of the obtained images by applying the selected image processing scheme, and to generate highlight content according to the selected or processed images.

According to various embodiments of the present disclosure, the electronic device may automatically perform more adaptive and meaningful image collection or image grouping according to an image collection environment, although users do not expend many efforts.

According to various embodiments of the present disclosure, the electronic device may apply a grouping degree of similar images among grouped images for each context in a different way or may statistically or aesthetically optimize the grouping degree of the similar images by performing image classification, image selection, and effect processing to suite an image collection context.

According to various embodiments of the present disclosure, the electronic device may minimize content capacity and may improve distribution of meaningful images by reducing distribution of images difficult to be identified among grouped images.

And, embodiments of the present disclosure described and shown in the drawings are provided as examples to describe technical content and help understanding but do not limit the scope of the present disclosure. Accordingly, it should be interpreted that besides the embodiments listed herein, all modifications or modified forms derived based on the technical ideas of the present disclosure are included in the scope of the present disclosure as defined in the claims, and their equivalents.

What is claimed is:

1. An electronic device comprising:
memory configured to store a plurality of images; and
a processor functionally connected with the memory and configured to:
determine an activity type associated with a source of the plurality of images during at least a portion of a time when the plurality of images was collected by the source, wherein the source is one of the electronic device and an external electronic device,
determine an image processing scheme for the activity type from among a plurality of image processing schemes,
apply the determined image processing scheme to one or more of the plurality of images as highlight images, and
generate a highlight content based on the highlight images.

2. The electronic device of claim 1, wherein the processor is configured to determine the activity type associated with the source, using at least one of a difference analysis of the plurality of images and a difference change analysis of one or more objects in the plurality of images.

3. The electronic device of claim 1, wherein the processor is configured to determine the activity type according to sensor information from the source.

4. The electronic device of claim 1, wherein the processor is configured to determine the activity type corresponding to at least a part of context information of the source, wherein the context information of the source is retrieved from the memory of the electronic device if the source is the electronic device, and is received from the external electronic device if the source is the external electronic device.

5. The electronic device of claim 4, wherein the context information of the source comprises alarm time information, business schedule information, rest schedule information, walking schedule information, meeting schedule information, closing schedule information, attendance schedule information and conference schedule information.

6. The electronic device of claim 1, wherein, for the image processing scheme, usage of at least one of a quality filter (QF), a duplicate filter (DF), and a classification filter (CF) is dependent upon the activity type, and wherein parameters for the QF, DF, and CF also depend upon the activity type.

7. The electronic device of claim 1, wherein the processor is configured to generate the highlight content by applying the image processing scheme in a same way for the plurality of images collected by the source during a specified time interval or collected by the source at a specified location.

8. The electronic device of claim 1, wherein the external electronic device is a wearable electronic device.

9. The electronic device of claim 1, wherein the processor is configured to output at least one of information about the activity type, the image processing scheme, and display information associated with the highlight content.

10. The electronic device of claim 9, wherein the processor is configured to change at least one of the determined activity type and the image processing scheme in response to a user input and control re-generation of the highlight content in response to the change.

11. An image processing method by an electronic device, the method comprising:
storing a plurality of images in memory of the electronic device;
determining an activity type associated with a source of the plurality of images during at least a portion of the time when the plurality of images was collected by the source, wherein the source is one of the electronic device and an external electronic device;
determining an image processing scheme for the activity type from among a plurality of image processing schemes;
applying the determined image processing scheme to one or more of the plurality of images as highlight images; and
generating highlight content from the highlight images.

12. The image processing method of claim 11, wherein determining the activity type associated with the source comprises using at least one of a difference analysis of the plurality of images and a difference change analysis of one or more objects in the plurality of images.

13. The image processing method of claim 11, wherein the activity type is determined according to sensor information from the source.

14. The image processing method of claim 11, wherein determining the activity type comprises determining according to at least a part of context information of the source, wherein the context information of the source is retrieved from memory of the electronic device if the source is the electronic device, and is received from the external electronic device if the source is the external electronic device.

15. The image processing method of claim 14, wherein the context information of the source comprises alarm time information, business schedule information, rest schedule information, walking schedule information, meeting schedule information, closing schedule information, attendance schedule information and conference schedule information.

16. The image processing method of claim 11, wherein the filtering condition of the image processing scheme comprises usage of at least one of a quality filter (QF), a duplicate filter (DF), and a classification filter (CF) with parameters for the QF, DF, and CF, wherein the usage of any of the QF, DF, and CF depends on the activity type, and the parameters for the QF, DF, and CF also depend on the activity type.

17. The image processing method of claim 11, wherein the highlight content is generated by applying the image processing scheme in a same way for the plurality of images collected by the source during a specified time interval or collected by the source at a specified location.

18. The image processing method of claim 11, wherein the external electronic device is a wearable electronic device.

19. The image processing method of claim 11, further comprising displaying at least one of information about the activity type, the determined image processing scheme, and display information associated with the highlight content.

20. The image processing method of claim 19, further comprising changing at least one of the determined activity type and the image processing scheme in response to a user input and re-generating the highlight content in response to the changing.

* * * * *